(12) United States Patent
Xu et al.

(10) Patent No.: US 11,215,897 B2
(45) Date of Patent: Jan. 4, 2022

(54) ARRAY SUBSTRATE, ELECTRONIC PAPER DISPLAY PANEL AND DRIVE METHOD THEREOF AND DISPLAY DEVICE

(71) Applicant: Shanghai Tianma Micro-Electronics Co., Ltd., Shanghai (CN)

(72) Inventors: Zuzhao Xu, Shanghai (CN); Kerui Xi, Shanghai (CN); Baiquan Lin, Shanghai (CN); Xiaohe Li, Shanghai (CN); Jine Liu, Shanghai (CN); Feng Qin, Shanghai (CN); Qiongqin Mao, Shanghai (CN); Tinghai Wang, Shanghai (CN); Mingwei Zhang, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 416 days.

(21) Appl. No.: 16/188,528

(22) Filed: Nov. 13, 2018

(65) Prior Publication Data

US 2019/0392771 A1 Dec. 26, 2019

(30) Foreign Application Priority Data

Jun. 21, 2018 (CN) .......................... 201810641880.9

(51) Int. Cl.
*G09G 3/34* (2006.01)
*G02F 1/1685* (2019.01)

(52) U.S. Cl.
CPC .......... *G02F 1/1685* (2019.01); *G09G 3/344* (2013.01); *G09G 2300/0426* (2013.01); *G09G 2300/0809* (2013.01); *G09G 2380/02* (2013.01)

(58) Field of Classification Search
CPC .... G09G 2300/0426; G09G 2300/0809–0871; G09G 2310/02–0297;
(Continued)

(56) References Cited

U.S. PATENT DOCUMENTS 5,903,249 A * 5/1999 Koyama ............... G09G 3/3659
345/92
2004/0090412 A1* 5/2004 Jeon ..................... G11C 19/184
345/100

(Continued)

FOREIGN PATENT DOCUMENTS

| CN | 104793419 A | 7/2015 |
|---|---|---|
| CN | 107092151 A | 7/2015 |
| CN | 107092151 A | 8/2017 |

OTHER PUBLICATIONS

Chinese Office Action for Chinese Priority Application No. 201810641880.9; Office Action dated Sep. 30, 2019.

*Primary Examiner* — Amr A Awad
*Assistant Examiner* — Aaron Midkiff
(74) *Attorney, Agent, or Firm* — von Briesen & Roper, s.c

(57) ABSTRACT

Provided are an array substrate, an electronic paper display panel and a drive method thereof and a display device. A display area includes a plurality of sub-display areas, a plurality of data lines in each sub-display area are electrically insulated from each other, corresponding data lines in different sub-display areas are electrically connected to each other, and a control signal line is configured to control display time of each sub-display area. When a control chip and a flexible circuit board are employed, only a small number of control chips and flexible circuit boards may drive the plurality of sub-display areas to display pictures.

17 Claims, 21 Drawing Sheets

(58) Field of Classification Search
CPC ............... G09G 3/3659; G09G 3/3688; G09G 2300/0814; G09G 2310/0297; G09G 3/344; G09G 3/3446; G09G 2310/04; G09G 2380/02; H01L 27/124–27/1248; G02F 1/167; G02F 1/16766; G02F 1/1685

See application file for complete search history.

(56) References Cited

U.S. PATENT DOCUMENTS

| | | | |
|---|---|---|---|
| 2009/0027325 A1* | 1/2009 | Kim | G02F 1/134336 345/92 |
| 2016/0086978 A1* | 3/2016 | French | H01L 27/1218 257/72 |
| 2017/0249911 A1* | 8/2017 | Ito | G09G 3/3677 |

* cited by examiner

ARRAY SUBSTRATE, ELECTRONIC PAPER DISPLAY PANEL AND DRIVE METHOD THEREOF AND DISPLAY DEVICE

CROSS-REFERENCES TO RELATED APPLICATIONS

This application claims priority to a Chinese patent application No. 201810641880.9 filed on Jun. 21, 2018, disclosure of which is incorporated herein by reference in its entirety.

TECHNICAL FIELD

The present disclosure relates to display techniques, and, in particular, to an array substrate, an electronic paper display panel, a drive method thereof and a display device.

BACKGROUND

Electronic paper display is a flat panel display technique with display performance similar to paper. An electronic paper display panel is widely applied in the fields of electronic readers (electronic books), electronic price cards, industrial instruments and meters, dynamic display billboards and media products.

Taking an oblong electronic paper display screen as product tags for example, the current oblong electronic paper display screen usually includes a plurality of small electronic paper display modules that are independently controlled and displayed. The spacing between each independent electronic paper display module is very small and different control chips work together to achieve the display effect of the entire oblong electronic paper display screen. However, because the plurality of small electronic paper display modules are independently controlled, a plurality of control chips and a plurality of flexible circuit boards need to be arranged to provide drive signals for data signal lines within the display screen. A considerable number of control chips are required, for example, electronic paper products longer than 1.5 m such as signs and billboards need 10 control chips, and the costs are high.

SUMMARY

The present disclosure provides an array substrate, an electronic paper display panel and a drive method thereof and a display device, so as to solve the problem in which a large number of control chips are required in the existing array substrate, electronic paper display panel and display device, and high costs are caused.

According to a first aspect, the present disclosure provides an array substrate. The array substrate provided by the present disclosure includes a display area and a non-display area. The display area includes a plurality of sub-display areas and a plurality of scanning lines, and each of the sub-display areas includes a plurality of data lines. The plurality of data lines are intersected with the plurality of scanning lines to form a plurality of sub-pixels. In the display area, sub-pixels in the same row are electrically connected to the same scanning line. In each sub-display area, sub-pixels in a same column are electrically connected to a same data line. The plurality of data lines in each sub-display area include a first data line, a second data line, . . . , and the Nth data line, the plurality of data lines in the each sub-display area are electrically insulated from each other, the first data lines in different sub-display areas are electrically connected to each other, the second data lines in different sub-display areas are electrically connected to each other, . . . , and the Nth data lines in different sub-display areas are electrically connected to each other, where N is an integer larger than or equal to 3. The array substrate provided by the present disclosure further includes at least two control signal lines, all sub-pixels in the each sub-display area are electrically connected to a same control signal line, and the sub-pixels in different sub-display areas are electrically connected to different control signal lines.

According to a second aspect, the present disclosure further provides an electronic paper display panel. The electronic paper display panel provided by the present disclosure includes an array substrate, an electrophoretic film and a common electrode layer. The electrophoretic film is disposed between the common electrode layer and the array substrate, and the plurality of sub-display areas of the array substrate are covered by the electrophoretic film. The array substrate may be the array substrate according to any one of the embodiments of the present disclosure.

According to a third aspect, the present disclosure further provides a display device. The display device according to the embodiments includes the electronic paper display panel according to any one of the embodiments of the present disclosure.

According to a fourth aspect, the present disclosure further provides a method for driving an electronic paper display panel. The electronic paper display panel includes an array substrate and the array substrate includes a display area and a non-display area. The display area includes a plurality of sub-display areas and a plurality of scanning lines. Each of the sub-display areas includes a plurality of data lines and the plurality of data lines are intersected with the plurality of scanning lines to form a plurality of sub-pixels. In each sub-display area, sub-pixels in a same column are electrically connected to a same data line. In the display area, sub-pixels in a same row are electrically connected to a same scanning line. The plurality of data lines in each sub-display area include a first data line, a second data line, . . . , and the Nth data line, the plurality of data lines in the each sub-display area are electrically insulated from each other, the first data lines in different sub-display areas are electrically connected to each other, the second data lines in different sub-display areas are electrically connected to each other, . . . , and the Nth data lines in different sub-display areas are electrically connected to each other, where N is an integer larger than or equal to 3. The array substrate further includes at least two control signal lines, all sub-pixels in each sub-display area are electrically connected to a same control signal line, and the sub-pixels in different sub-display areas are electrically connected to different control signal lines.

The drive method includes: controlling, through the at least two control signal lines, sub-pixels in at least one of the sub-display areas to be turned on and sub-pixels in other sub-display areas to be turned off; sequentially inputting scanning signals to the plurality of scanning lines; and charging, through the plurality of data lines, the sub-pixels that are turned on.

In the array substrate, the electronic paper display panel and the drive method thereof and the display device provided by the present disclosure, the display area includes the plurality of sub-display areas. The plurality of data lines in each sub-display area are electrically insulated from each other, corresponding data lines in different sub-display areas are electrically connected to each other and a control signal line is configured to control display time of each sub-display area, thereby reducing the number of data signal pins and saving costs. When a control chip and a flexible circuit board are employed, only a small number of control chips and flexible circuit boards, even only one control chip and one flexible circuit board, may drive the plurality of sub-display areas to display pictures. Compared with the related art, the number of control chips and flexible circuit boards may be reduced, thereby saving costs.

BRIEF DESCRIPTION OF DRAWINGS

To illustrate technical solutions in embodiments of the present disclosure or in the related art more clearly, drawings used in description of the embodiments or the related art will be briefly described below. Apparently, the drawings described below illustrate only part of the embodiments of the present disclosure, and those skilled in the art may obtain other drawings based on the drawings described below on the premise that no creative work is done.

DETAILED DESCRIPTION

The technical solutions of the present disclosure will be described clearly and completely with reference to the drawings through embodiments from which the object, technical solutions and advantages of the present disclosure will be apparent. Apparently, the embodiments described below are merely a part, not all, of embodiments of the present disclosure. On the basis of the embodiments described herein, all other embodiments obtained by those skilled in the art without creative work are within the scope of the present disclosure.

Figure 1:
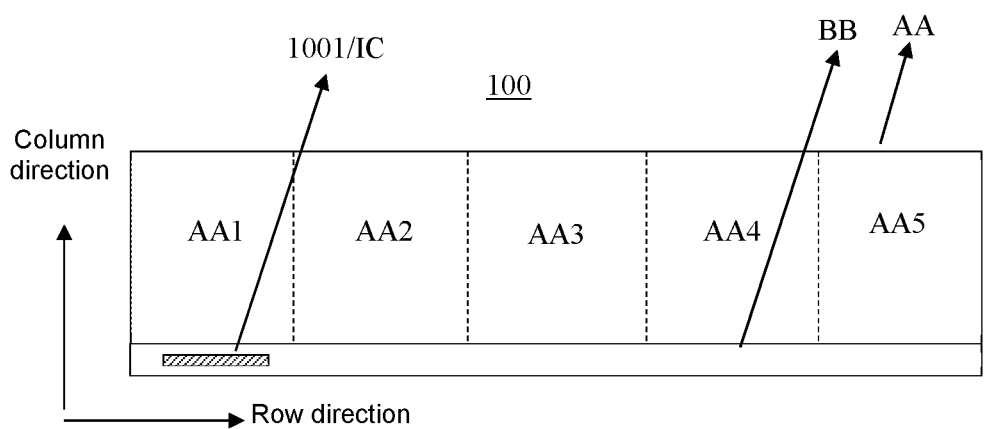
FIG. 1 is a structural diagram of an array substrate according to an embodiment of the present disclosure.

FIG. 1 is a structural diagram of an array substrate according to an embodiment of the present disclosure. With reference to FIG. 1, an array substrate 100 includes a display area AA and a non-display area BB disposed on at least one side of the display area AA or disposed around the display area AA. The display area AA includes at least two sub-display areas and exemplarily illustrated in FIG. 1 are five sub-display areas, i.e. a first sub-display area AA1, a second sub-display area AA2, a third sub-display area AA3, a forth sub-display area AA4 and a fifth sub-display area AA5. The plurality of sub-display areas are sequentially arranged in the row direction to form a strip-shaped array substrate 100 extending along the row direction, and the array substrate may individually control each sub-display area, so that different pictures are displayed in each sub-display area of a display panel, which is formed by the array substrate. The non-display area BB of the array substrate 100 is further provided with a bonding area 1001. The bonding area 1001 is disposed below one of the sub-display areas (for example, the first sub-display area AA1) and is configured to bond a control chip (IC) and/or a flexible circuit board.

Figure 2:
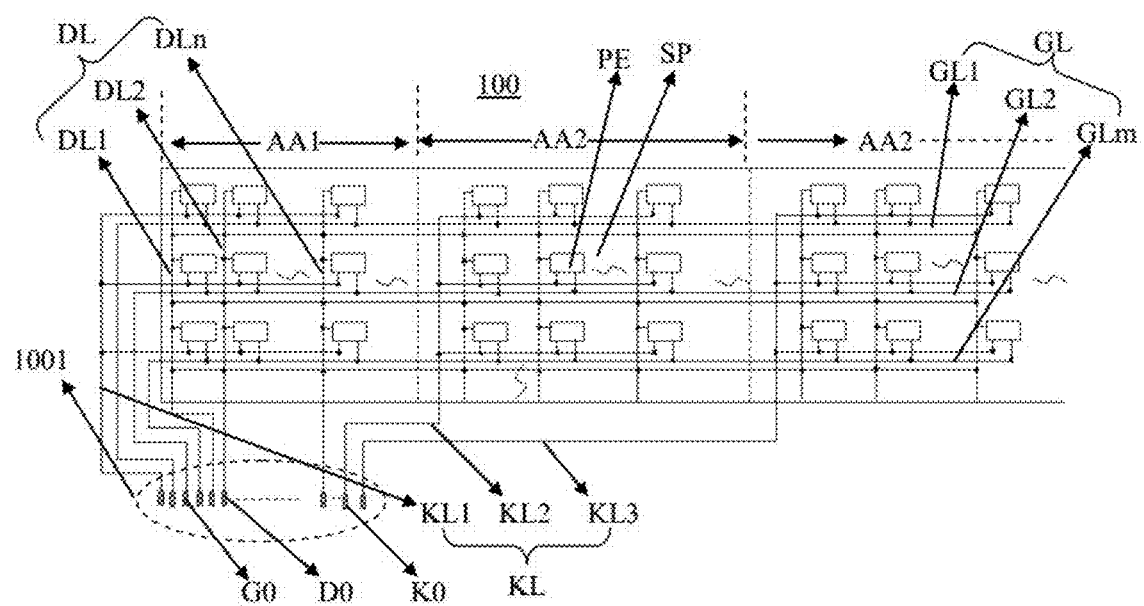
FIG. 2 is a structural diagram of pixels of the array substrate illustrated in FIG. 1.
Figure 3:
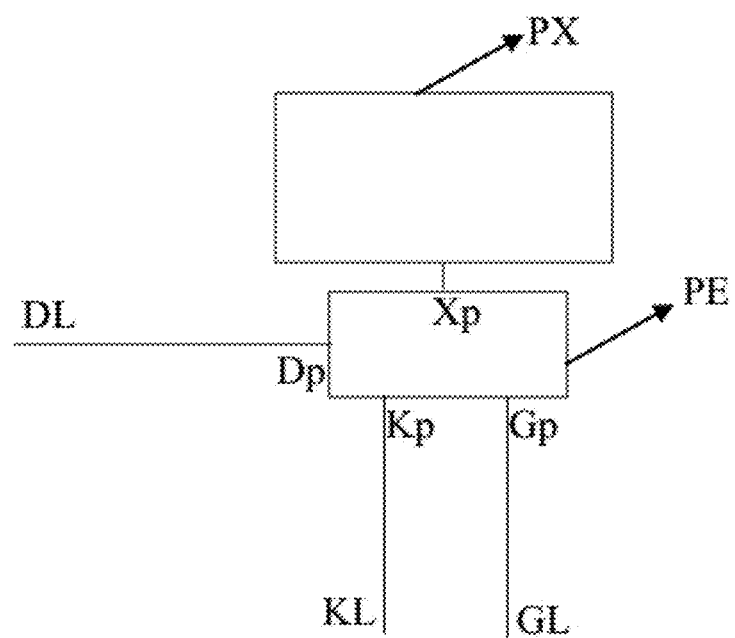
FIG. 3 is a structural diagram of one sub-pixel of the array substrate illustrated in FIG. 1.

FIG. 2 is a structural diagram of pixels of the array substrate illustrated in FIG. 1, and FIG. 3 is a structural diagram of one sub-pixel of the array substrate illustrated in FIG. 1. For clarity, only part of sub-display areas of the array substrate is exemplarily illustrated in FIG. 2. The array substrate 100 illustrated in FIGS. 1, 2 and 3 includes the first sub-display area AA1, the second sub-display area AA2 and the third sub-display area AA3. The three sub-display areas are arranged in the row direction and form a strip-shaped array substrate extending along the row direction. The array substrate 100 is further provided with a plurality of scanning lines GL extending along the row direction and arranged along the column direction. The plurality of scanning lines GL separately penetrate the first sub-display area AA1, the second sub-display area AA2 and the third sub-display area AA3 sequentially, i.e., the first sub-display area AA1, the second sub-display area AA2 and the third sub-display area AA3 share the plurality of scanning lines GL. Each sub-display area (AA1, AA2, AA3 and . . . ) is separately provided with a plurality of data lines DL and in each sub-display area, the plurality of data lines DL are extended along the column direction and are arranged along the row direction. In each sub-display area, the plurality of data lines DL are intersected with the multiple scanning lines GL to form multiple sub-pixels (SPs) arranged in an array.

In the display area, sub-pixels (SPs) in the same row are electrically connected to the same scanning line GL and in each sub-display area (AA1, AA2, AA3 and . . . ), sub-pixels (SPs) in the same column are electrically connected to the same data line DL. For example, the plurality of scanning lines GL include a first scanning line GL1, a second scanning line GL2, and an Mth scanning line GLm, which are electrically insulated from each other and which are electrically connected to sub-pixels (SPs) in the first row, the second row, . . . , and the Mth row separately on the array substrate 100; in each sub-display area (AA1, AA2, AA3 and . . . ), the plurality of data lines DL include a first data line DL1, a second data line DL2, . . . , and an Nth data line DLn, which are electrically insulated from each other and which are electrically connected to sub-pixels (SPs) in the first column, the second column, . . . , and the Nth column separately in their respective sub-display area, where M and N are both integers greater than or equal to 3.

In this embodiment, first data lines DL1 in different sub-display areas (AA1, AA2, AA3 and . . . ) are electrically connected to each other, second data lines DL2 in different sub-display areas (AA1, AA2, AA3 and . . . ) are electrically connected to each other, . . . , and Nth data lines DLn in different sub-display areas (AA1, AA2, AA3 and . . . ) are electrically connected to each other.

Specifically, the non-display area BB of the array substrate 100 is further provided with data signal pins DO. The first data line DL1 in the second sub-display area AA2 and the first data line DL1 in the third sub-display area AA3 are simultaneously electrically connected to the first data line DL1 in the first sub-display area AA1, and are electrically connected to a corresponding data signal pin DO disposed in the non-display area BB through the first data line DL1 in the first sub-display area AA1; the second data line DL2 in the second sub-display area AA2 and the second data line DL2 in the third sub-display area AA3 are electrically connected to the second data line DL2 of the first sub-display area AA1, and are simultaneously electrically connected to a corresponding data signal pin DO disposed in the non-display area BB through the second data line DL2 in the first sub-display area AA1; . . . ; the Nth data line DLn in the second sub-display area AA2 and the Nth data line DLn in the third sub-display area AA3 are simultaneously electrically connected to the Nth data line DLn in the first sub-display area AA1, and are electrically connected to a corresponding data signal pin DO disposed in the non-display area BB through the Nth data line DLn in the first sub-display area AA1. In this way, the corresponding data lines DL in different sub-display areas (AA1, AA2, AA3, and . . . ) may be electrically connected to the same data signal pin DO, to reduce the number of data signal pins DO. In the array substrate 100 composed of a plurality of sub-display areas (AA1, AA2, AA3 and . . . ), data signal pins DO may no longer be individually set for one or multiple sub-display areas. Furthermore, a data signal pin DO may only be set in the non-display area corresponding to one of the sub-display areas (for example, the first sub-display area AA1) and all data lines DL in other sub-display areas may be electrically connected to the data signal pin DO through data lines DL in the sub-display area (for example, the first sub-display area AA1).

The array substrate 100 further includes at least two control signal lines KL. All sub-pixels (SPs) in each sub-display area (AA1, AA2, AA3 and . . . ) are electrically connected to the same control signal line KL. Sub-pixels (SPs) in different sub-display areas (AA1, AA2, AA3 and . . . ) are electrically connected to different control signal lines KL.

For example, control signal lines KL may be disposed in one-to-one correspondence to the sub-display areas (AA1, AA2, AA3 and . . . ) and the number of control signal lines KL is equal to the number of sub-display areas (AA1, AA2, AA3 and . . . ). For example, multiple sub-display areas (AA1, AA2, AA3 and . . . ) include a first sub-display area AA1, a second sub-display area AA2 and a third sub-display area AA3, and the control signal lines KL include a first control signal line KL1, a second control signal line KL2 and a third control signal line KL3. All sub-pixels (SPs) in the first sub-display area AA1 are electrically connected to the first control signal line KL1, all sub-pixels (SPs) in the second sub-display area AA2 are electrically connected to the second control signal line KL2, and all sub-pixels (SPs) in the third sub-display area AA3 are electrically connected to the third control signal line KL3, and so on. When only one sub-display area needs to display pictures, or one sub-display area needs to update displayed pictures, the control signal line KL electrically connected to the sub-display area is turned on while control signal lines KL electrically connected to other sub-display areas are turned off; multiple scanning lines GL are turned on to sequentially scan multiple rows of sub-pixels from top to bottom; and data signals are written through multiple data lines DL in the sub-display area, so that each sub-display area may be individually controlled. When two or more sub-display areas need to display pictures, or two or more sub-display areas need to update displayed pictures, pictures in the two or more sub-display areas are updated sequentially in the above-mentioned way.

Specifically, for example, each sub-pixel (SP) further includes a pixel drive module PE and a pixel electrode PX. The pixel drive module PE includes at least a control signal input terminal Kp, a scanning signal input terminal Gp, a data signal input terminal Dp, and a data signal output terminal Xp. The control signal input terminal Kp of the pixel drive module PE is electrically connected to a corresponding control signal line KL, the control signal line KL provides switching signals for the pixel drive module PE to control the pixel drive module PE to be turned off or turned on, and the other end of the control signal line KL is electrically connected to a control signal pin disposed in the non-display area. The scanning signal input terminal Gp of the pixel drive module PE is electrically connected to a corresponding scanning line GL, and the other end of the scanning line GL is electrically connected to a scanning signal pin disposed in the non-display area. The data signal input terminal Dp of the pixel drive module PE is electrically connected to a corresponding data line DL, the data signal output terminal Xp of the pixel drive module PE is electrically connected to the pixel electrode PX and the other end of the data line DL is electrically connected to a data signal pin disposed in the non-display area. When the pixel drive module PE in one sub-display area is turned on under the control of switching signals provided by the control signal line KL, all pixel drive modules PE in the sub-display area are turned on, a plurality of scanning lines GL sequentially scan rows of sub-pixels (SPs) in the sub-display area from top to bottom, and data lines DL in the sub-display area provide data signals for the pixel electrode PX in the corresponding sub-pixel (SP), so that the sub-display area displays pictures or updates displayed pictures.

In this embodiment, the bonding area 1001 is merely disposed in the non-display area below one sub-display area (for example, the first sub-display area AA1), the data signal pin DO, the scanning signal pin GO and the control signal pin KO are disposed in the bonding area 1001 of the array substrate, and data lines DL, scanning lines GL and control signal lines KL in all sub-display areas are electrically connected to the corresponding pins in the bonding area 1001. The array substrate 100 further includes a control chip (IC), for example, may include only one control chip (IC). The control chip (IC) is bonded in the bonding area 1001 of the array substrate, and the data signal pin DO, the scanning signal pin GO and the control signal pin KO are electrically connected to a corresponding drive pin of the control chip IC. The array substrate, for example, may further include a flexible circuit board, and the drive pins of the control chip (IC) are electrically connected to an external drive circuit through traces on the flexible circuit board.

The display area of the array substrate provided in this embodiment includes multiple sub-display areas separately controlled. A plurality of data lines in each sub-display area are electrically insulated from each other and data lines in different sub-display areas are electrically connected to each other, and control signal lines are used for controlling each sub-display area to be turned on or off. The data signal pin may be disposed only in the non-display area corresponding to one sub-display area and data lines in other sub-display areas are electrically connected to the data signal pin through data lines in the sub-display area, thereby reducing the number of data signal pins. Each scanning line sequentially penetrates the multiple sub-display areas, so that sub-pixels in the same row in the whole display area may be scanned by the same scanning line, thereby reducing the number of scanning signal pins and saving costs. At the same time, control signal lines are configured to control each sub-display area to be turned on or off, so that different sub-display areas may also be separately controlled even if corresponding data lines in different sub-display areas share the same data signal pin.

When the control chip and the flexible circuit board are employed, only a small number of control chips and flexible circuit boards, even only one control chip and one flexible circuit board, may drive multiple sub-display areas to display pictures. Compared with multiple control chips and multiple flexible circuit boards in the related art, the number of control chips and flexible circuit boards is reduced, thereby saving costs.

Figure 4:
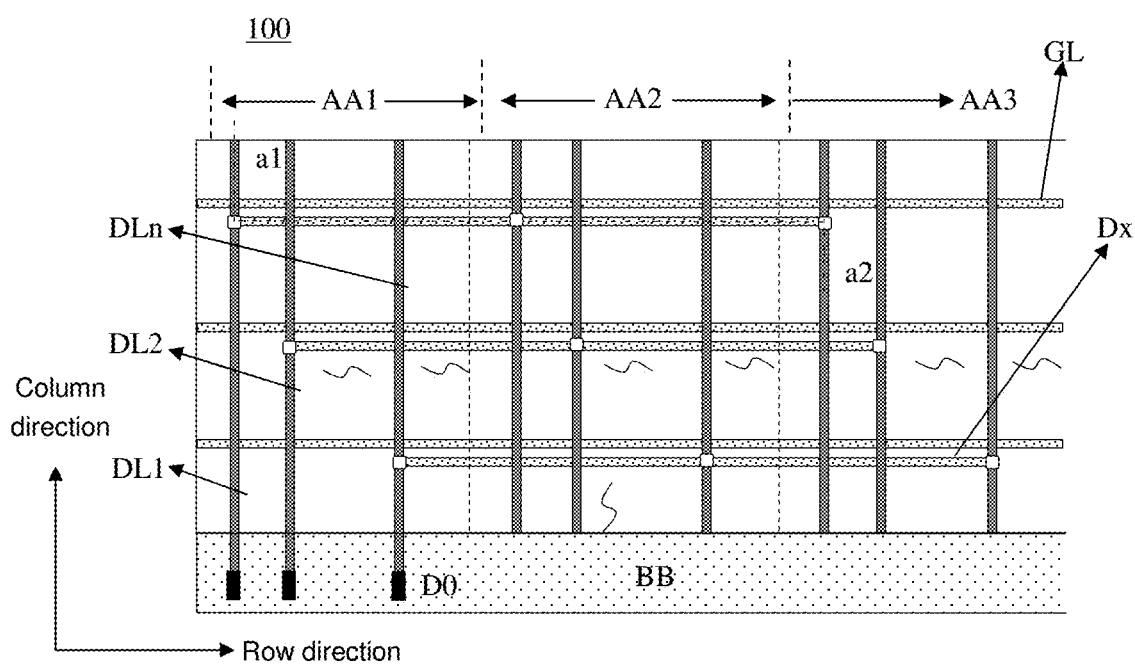
FIG. 4 is a structural diagram of another array substrate according to an embodiment of the present disclosure.
Figure 5:
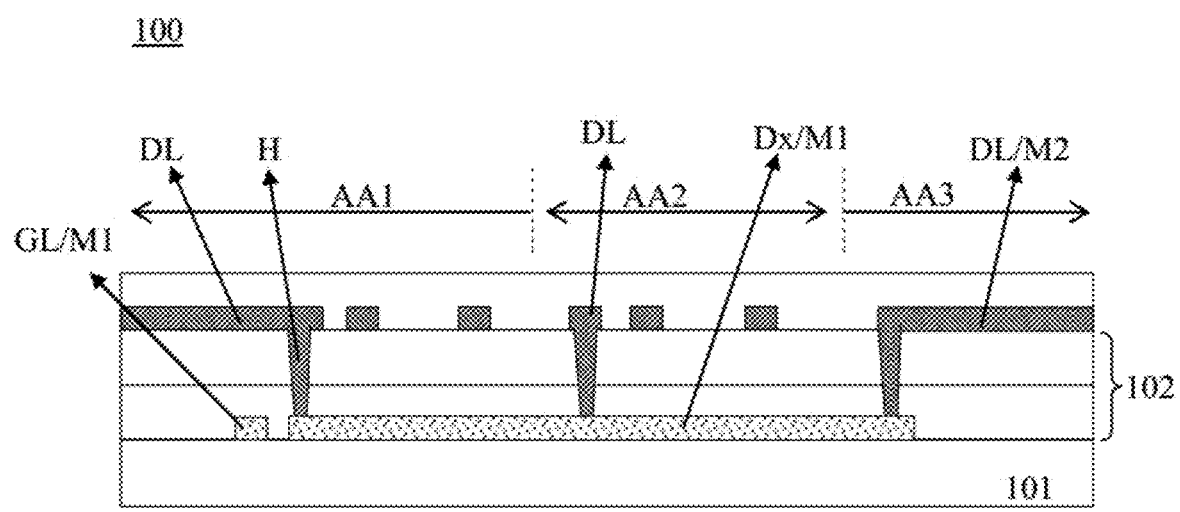
FIG. 5 is a sectional view taken along a line a1-a2 of FIG. 4.

FIG. 4 is a structural diagram of another array substrate according to an embodiment of the present disclosure, and FIG. 5 is a sectional view taken along a line a1-a2 of FIG. 4. FIGS. 4 and 5 illustrate a manner of connecting data lines in different sub-display areas. In this embodiment, an array substrate 100 includes a first sub-display area AA1, a second sub-display area AA2 and a third sub-display area AA3. Multiple sub-display areas (AA1, AA2, AA3 and . . . ) are arranged along the row direction. A plurality of scanning lines GL are extended along the row direction and arranged in the column direction and the plurality of scanning lines GL separately pass through the first sub-display area AA1, the second sub-display area AA2 and the third sub-display area AA3 sequentially. Sub-pixels in the same row are electrically connected to the same scanning line GL. Each sub-display area (AA1, AA2, AA3 and . . . ) is provided with a plurality of data lines DL. In each sub-display area, the plurality of data lines DL are extended along the column direction and arranged along the row direction, and sub-pixels in the same column are connected to the same data line DL. Specifically, the plurality of data lines DL include a first data line DL1, a second data line DL2, . . . , and a Nth data line DLn, which are electrically insulted from each other, are separately electrically connected to sub-pixels in the first column, the second column, . . . , and the Nth column in their respective sub-display area, where N is an integer greater than or equal to 3.

In this embodiment, the array substrate 100 further includes a plurality of connection lines Dx disposed in the display area. The data lines DL in different sub-display areas are electrically connected to each other through connection lines Dx. For example, the first data line DL1 in the second sub-display area AA2 and the first data line DL1 in the third sub-display area AA3 are electrically connected to the first data line DL1 in the first sub-display area AA1 through a same connection line Dx; the second data line DL2 in the second sub-display area AA2 and the second data line DL2 in the third sub-display area AA3 are electrically connected to the second data line DL2 of the first sub-display area AA1 through a same connection line Dx; . . . ; the Nth data line DLn in the second sub-display area AA2 and the Nth data line DLn in the third sub-display area AA3 are electrically connected to the Nth data line DLn in the first sub-display area AA1 through a same connection line Dx. In this way, data lines in the second sub-display area AA2 and data lines in the third sub-display area AA3 are electrically connected to data signal pins DO disposed in the non-display area BB through data lines in the second sub-display area AA1.

Specifically, a plurality of data lines DL in each sub-display area may be disposed in the same film layer and a plurality of connection lines Dx and a plurality of data lines DL in each sub-display area are disposed in different film layers.

With reference to FIG. 5, in this embodiment, the array substrate 100 includes: a substrate 101, a first metal layer M1, a first passivation layer 102, and a second metal layer M2. The first metal layer M1 is disposed on the substrate 101 and includes a plurality of scanning lines GL and a plurality of connection lines Dx which are electrically insulated from each other, where the plurality of connection lines Dx are extended along the row direction and are arranged along the column direction and the plurality of scanning lines GL are extended along the row direction and are arranged along the column direction. In the manufacturing process, for example, the plurality of scanning lines GL and the plurality of connection lines Dx may be formed by patterning the first metal layer M1. The first passivation layer 102 is disposed on the substrate 101 and the first metal layer M1 is covered by the first passivation layer 102. The second metal layer M2 is disposed on the first passivation layer 102. The second metal layer M2 and the first metal layer M1 are stacked and insulated from each other through the first passivation layer 102. The second metal layer M2 includes a plurality of data lines DL which are electrically insulated from each other, and the plurality of multiple data lines DL are extended along the column direction and arranged along the row direction. The first data lines DL1 in the first sub-display area AA1, the second sub-display area AA2 and the third sub-display area AA3 are electrically connected to a same connection line Dx through via holes H penetrating the first passivation layer 102; the second data lines DL2 in the first sub-display area AA1, the second sub-display area AA2 and the third sub-display area AA3 are electrically connected to a same connection line Dx through via holes H penetrating the first passivation layer 102; . . . ; the Nth data lines DLn in the first sub-display area AA1, the second sub-display area AA2 and the third sub-display area AA3 are electrically connected to a same connection line Dx through via holes H penetrating the first passivation layer 102.

In this way, data lines in different sub-display areas are electrically connected to each other through connection lines disposed in the display area, thereby reducing the number of data signal pins and control chips, saving costs and reducing the number of traces in the non-display area, and further reducing the non-display area and increasing the proportion of the display area on the array substrate. Moreover, in this embodiment, connection lines and scanning lines are formed in the same layer and in the same manufacture step, which does not increase the number of masks and further saves costs.

Figure 6:
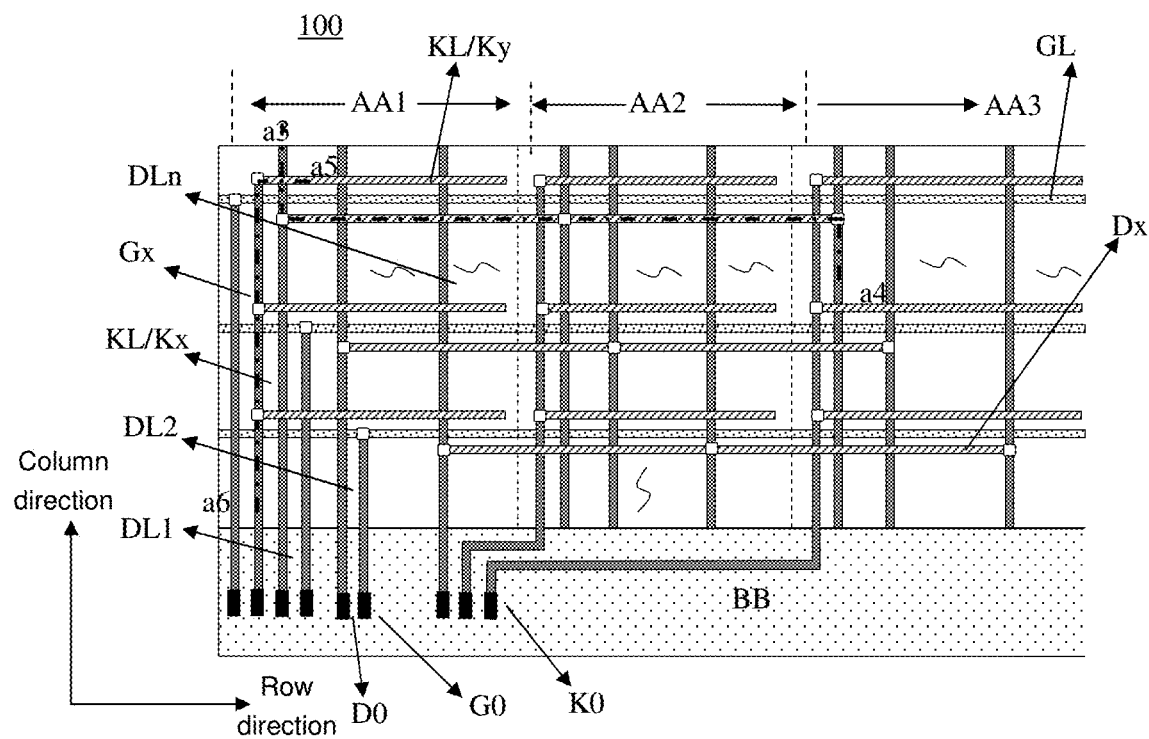
FIG. 6 is a structural diagram of another array substrate according to an embodiment of the present disclosure.
Figure 7:
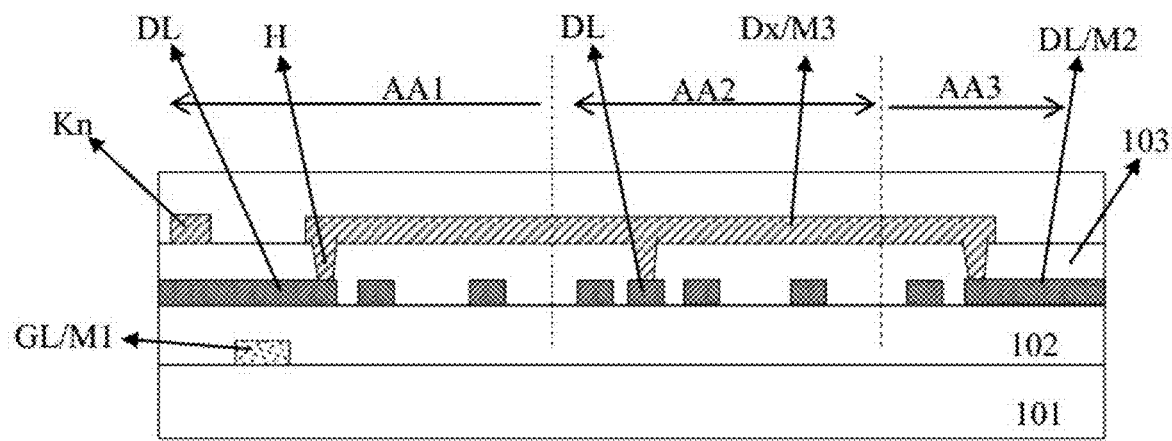
FIG. 7 is a sectional view taken along a line a3-a4 of FIG. 6.
Figure 8:
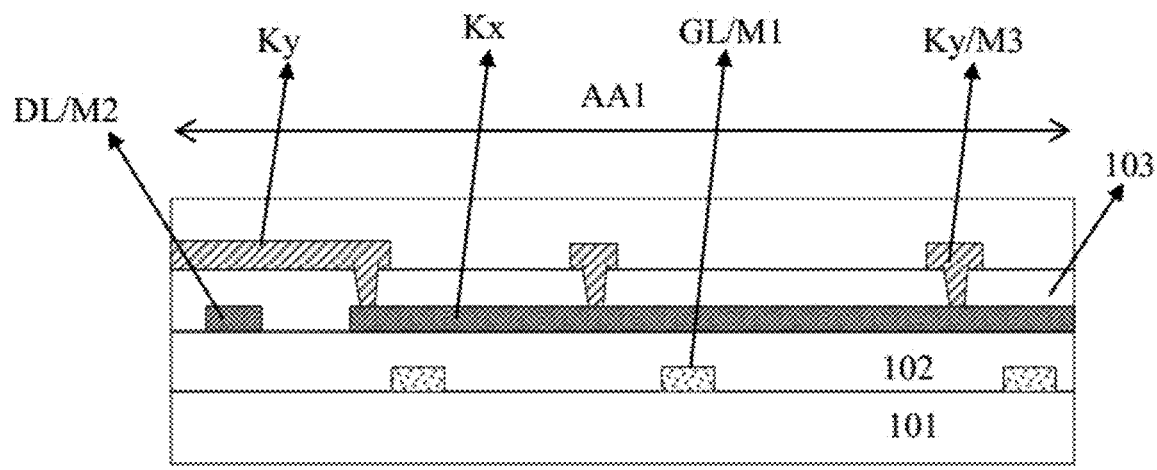
FIG. 8 is a sectional view taken along a line a5-a6 of FIG. 6.

FIG. 6 is a structural diagram of another array substrate according to an embodiment of the present disclosure, FIG. 7 is a sectional view taken along a line a3-a4 of FIG. 6, and FIG. 8 is a sectional view taken along a line a5-a6 of FIG. 6. In this embodiment, an array substrate 100 includes a first sub-display area AA1, a second sub-display area AA2 and a third sub-display area AA3. Multiple sub-display areas (AA1, AA2, AA3 and . . . ) are arranged along the row direction. A plurality of scanning lines GL separately pass through the first sub-display area AA1, the second sub-display area AA2 and the third sub-display area AA3 sequentially. Sub-pixels in the same row in different sub-display areas are electrically connected to the same scanning line GL. A plurality of data lines DL are disposed in each sub-display area (AA1, AA2, AA3 and . . . ). In each sub-display area, the plurality of data lines DL are extended along the column direction and arranged along the row direction, and sub-pixels in the same column are electrically connected to the same data line DL. The array substrate 100 further includes at least two control signal lines KL. All sub-pixels (SPs) in each sub-display area (AA1, AA2, AA3 and . . . ) are electrically connected to the same control signal line KL, and sub-pixels (SPs) in different sub-display areas (AA1, AA2, AA3 and . . . ) are electrically connected to different control signal lines KL.

In this embodiment, the array substrate 100 further includes a plurality of connection lines Dx disposed in the display area. Data lines DL in different sub-display areas are electrically connected to each other through connection lines Dx.

Specifically, the array substrate 100 may include a first metal layer M1, a second metal layer M2 and a third metal layer M3, which are sequentially stacked. A plurality of scanning lines GL are formed in the first metal layer M1, plurality of data lines DL are formed in the second metal layer M2 and plurality of connection lines Dx are formed in the third metal layer M3.

With reference to FIGS. 7 and 8, in this embodiment, the array substrate 100 includes: a substrate 101, a first metal layer M1, a first passivation layer 102, a second metal layer M2, a second passivation layer 103, and a third metal layer M3. The first metal layer M1 is disposed on the substrate 101 and includes a plurality of scanning lines GL which are electrically insulated from each other, and the plurality of scanning lines GL are extended along the row direction and arranged along the column direction. In the manufacture process, for example, scanning lines GL may be formed by patterning the first metal layer M1. The first passivation layer 102 is disposed on the substrate 101 and the first metal layer M1 is covered by the first passivation layer 102. The second metal layer M2 is disposed on the first passivation layer 102. The second metal layer M2 and the first metal layer M1 are stacked and insulated from each other through the first passivation layer 102. The second metal layer M2 includes a plurality of data lines DL which are electrically insulated from each other, and the plurality of data lines DL are extended along the column direction and arranged along the row direction. The second passivation layer 103 is disposed on the first passivation layer 102 and the second metal layer M2 is covered by the second passivation layer 103. The third metal layer M3 is disposed on the second passivation layer 103. The third metal layer M3 and the second metal layer M2 are stacked and insulated from each other through the second passivation layer 103. The third metal layer M3 includes a plurality of connection lines Dx which are electrically insulated from each other. The plurality of data lines DL are electrically connected to corresponding connection lines Dx separately through holes H penetrating the second passivation layer 103. For example, the first data lines DL1 in the first sub-display area AA1, the second sub-display area AA2 and the third sub-display area AA3 are electrically connected to a same connection line Dx through holes H penetrating the second passivation layer 103; the second data lines DL2 in the first sub-display area AA1, the second sub-display area AA2 and the third sub-display area AA3 are electrically connected to a same connection line Dx through holes H penetrating the second passivation layer 103; . . . ; the Nth data lines DLn in the first sub-display area AA1, the second sub-display area AA2 and the third sub-display area AA3 are electrically connected to a same connection line Dx through holes H penetrating the second passivation layer 103, where N is an integer greater than or equal to 3.

In this embodiment, each control signal line KL includes a main line Kx extending along the column direction and multiple sublines Ky extending along the row direction and arranged along the column direction. In each sub-display area, sub-pixels in the same row are electrically connected to a same subline Ky. Each sub-pixel is electrically connected to the main line Kx through a subline Ky, and finally electrically connected to a control signal pin KO disposed in the non-display area. The main line Kx of each control signal line KL is extended from the display area to the non-display area BB. The main lines Kx of all control signal lines KL, for example, may be formed in the second metal layer M2, or be formed in the same layer as the data lines DL. The sublines Ky of all control signal lines KL may be formed in the third metal layer M3, or be formed in the same layer as the connection lines Dx. Each subline Ky is electrically connected to the corresponding main line Kx through a hole H penetrating the second passivation layer 103.

Specifically, control signal pins KO are all disposed in the non-display area below one sub-display area (for example, the first sub-display area AA1). The main lines Kx of the control signal lines KL corresponding to the sub-display area (for example, the first sub-display area AA1) are extended along the column direction to the non-display area BB, and are electrically connected to a corresponding control signal pin KO disposed here. The main lines Kx of the control signal lines KL corresponding to other sub-display areas (for example, the second sub-display area AA2, the third sub-display area AA3 and . . . ) of the array substrate are extended along the column direction to the non-display area BB, then change the direction in the non-display area BB to a place below the first sub-display area AA1 to be electrically connected to corresponding control signal pins KO disposed here.

In this embodiment, the array substrate 100 further includes multiple scanning signal lead wires Gx extending along the column direction, and the multiple scanning signal lead wires Gx are arranged along the row direction. Each scanning signal lead Gx is electrically connected to each scanning line DL in one-to-one correspondence. A plurality of scanning lines GL are electrically connected to scanning signal pins GO disposed in the non-display area BB through the multiple scanning signal lead wires Gx. For example, all scanning signal lead wires Gx may be formed in the second metal layer M2, or formed in the same layer as data lines DL. Each scanning line GL is electrically connected to a corresponding scanning signal lead Gx through a hole penetrating the first passivation layer 102. Specifically, scanning signal pins GO are all disposed in the non-display area BB below one sub-display area (for example, the first sub-display area AA1). Multiple scanning signal lead wires Gx are all extended from the sub-display area (for example, the first sub-display area AA1) to the non-display area BB and are separately electrically connected to corresponding scanning signal pins GO.

Therefore, all data signal pins DO, control signal pins KO and scanning signal pins GO may be disposed in the non-display area below a same sub-display area (for example, the first sub-display area), or in the same bonding area, so as to achieve the purpose of driving the entire array substrate through a few or a single control chip and/or flexible circuit board, thereby saving costs and increasing the proportion of the display area. Compared with a plurality of scanning lines that are extended along the row direction to the non-display area at one end of the array substrate and then wind to the bonding area, in this embodiment, the plurality of scanning lines are electrically connected to scanning signal pins disposed in the non-display area through the multiple scanning signal lead wires disposed in the display area, which may further reduce the non-display area and increase the proportion of the display area. In this embodiment, main lines of the plurality of control signal lines, the multiple scanning signal lead wires and the multiple data lines are formed in the same layer and made from identical materials. Sublines of the plurality of control signal lines and the plurality of connection lines are formed in the same layer and made from identical materials. Therefore, the number of masks and manufacture processes is reduced and costs are saved.

Figure 9:
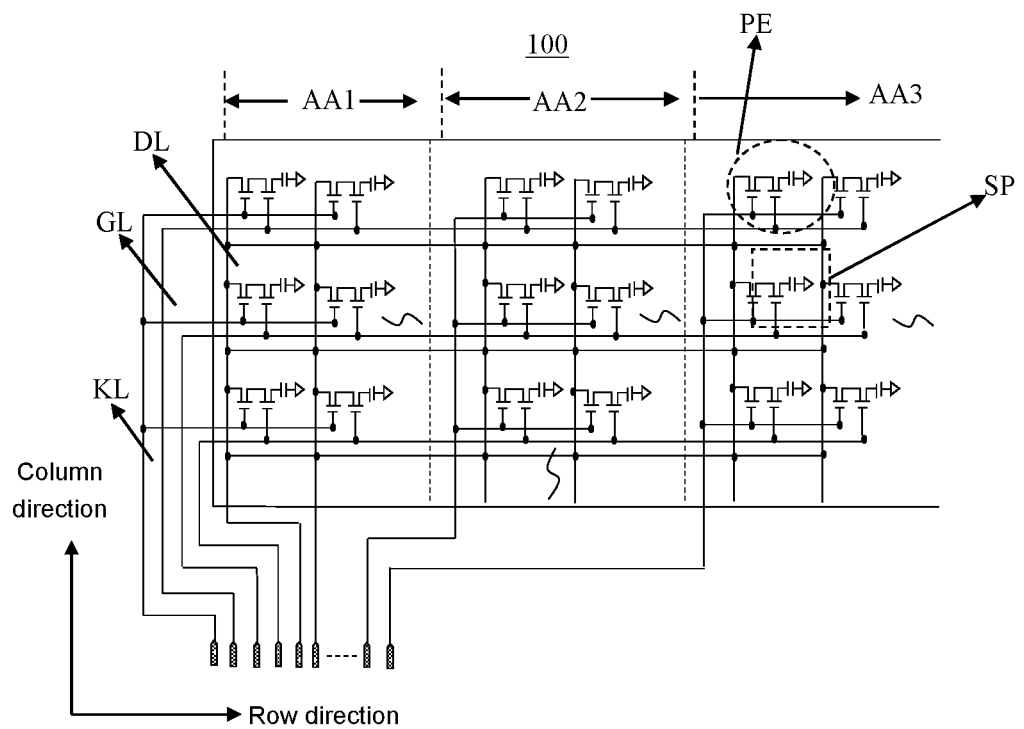
FIG. 9 is a structural diagram of another array substrate according to an embodiment of the present disclosure.
Figure 10:
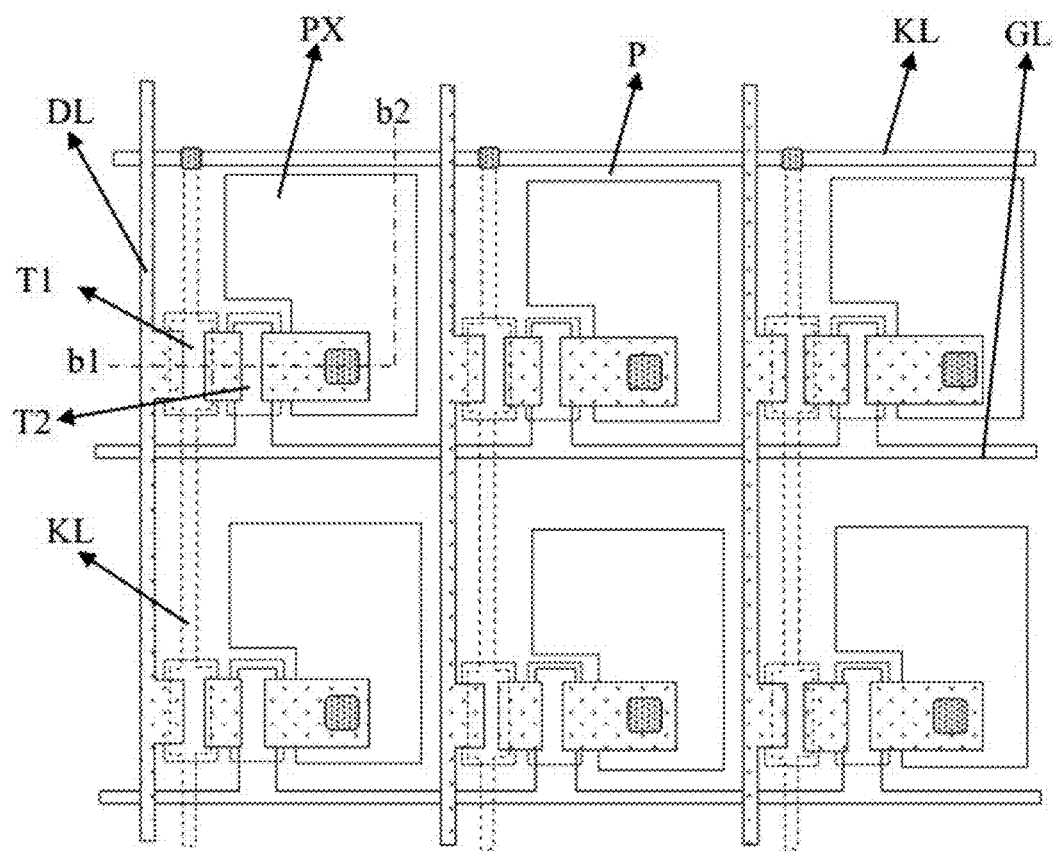
FIG. 10 is a structural diagram of another array substrate according to an embodiment of the present disclosure.
Figure 11:
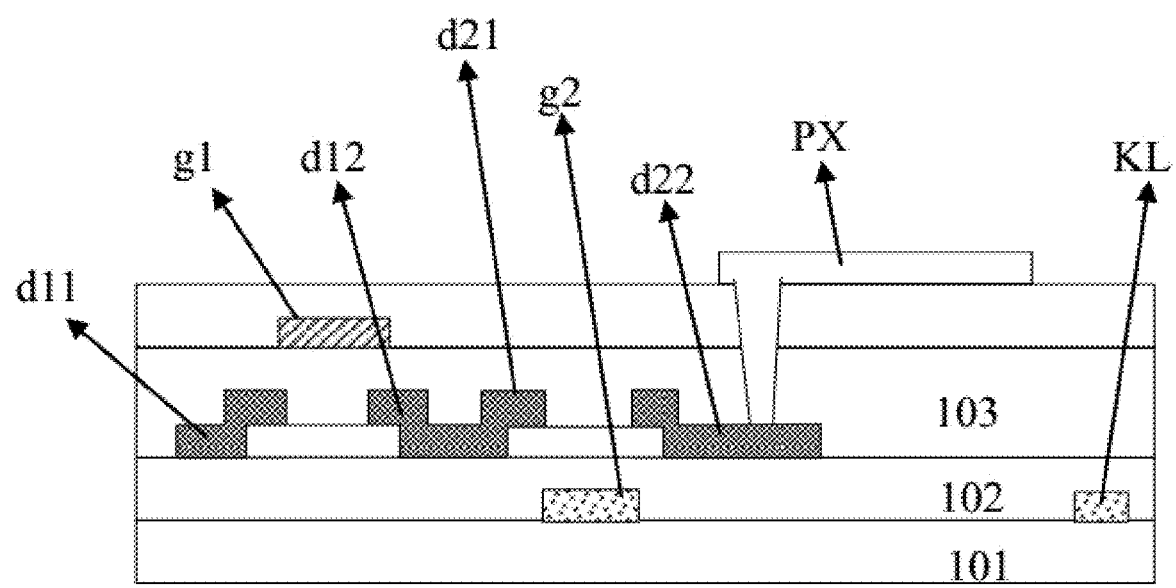
FIG. 11 is a sectional view taken along a line b1-b2 of FIG. 10.

FIG. 9 is a structural diagram of another array substrate according to an embodiment of the present disclosure, and FIG. 10 is a structural diagram of pixels of the array substrate illustrated in FIG. 9. FIG. 11 is a sectional view taken along a line b1-b2 of FIG. 10. In this embodiment, each sub-pixel (SP) is provided with a pixel drive module PE. Each pixel drive module PE includes a first transistor T1 and a second transistor T2. A first electrode d11 of the first transistor T1 is electrically connected to a data signal input terminal of the pixel drive module PE. A first electrode d21 of the second transistor T2 is electrically connected to a data signal output terminal of the pixel drive module PE. A control terminal g1 of the first transistor T1 is electrically connected to a control signal input terminal of the pixel drive module PE. A control terminal g2 of the second transistor T2 is electrically connected to a scanning signal input terminal of the pixel drive module PE.

Furthermore, in this embodiment, the first electrode d11 of the first transistor T1 is electrically connected to a corresponding data line DL, a second electrode d12 of the first transistor T1 is electrically connected to a first electrode d21 of the second transistor T2, and the second electrode d22 of the second transistor T2 is electrically connected to a pixel electrode PX.

The control terminal g1 of the first transistor T1 is electrically connected to a corresponding control signal line KL, the control terminal g2 of the second transistor T2 is electrically connected to a corresponding scanning line GL. Optionally, the control terminal g1 of the first transistor T1 is electrically connected to the corresponding scanning line GL, and the control terminal g2 of the second transistor T2 is electrically connected to the corresponding control signal line KL. When one sub-display area needs to display pictures, or one sub-display area needs to update displayed pictures, the control signal line KL electrically connected to the sub-display area is turned on, all pixel drive modules PE in the sub-display area are in a conducting state, a plurality of scanning lines GL sequentially scan rows of sub-pixels (SPs) in the sub-display area, and a plurality of data lines DL in the sub-display area provide data signals for pixel electrodes PX in corresponding sub-pixels (SPs), so that the sub-display area may display pictures or update displayed pictures, thereby achieving the individual control of each sub-display area.

In this embodiment, since the array substrate includes multiple sub-display areas individually controlled, the array substrate has a high frame refresh frequency. For example, the first transistor T1 and the second transistor T2 may be low temperature polysilicon thin film transistors. The low temperature polysilicon thin film transistor has high electron mobility, and may ensure the charging rate of each sub-pixel, thereby better meeting picture refreshing requirements of the oblong array substrate.

Figure 12:
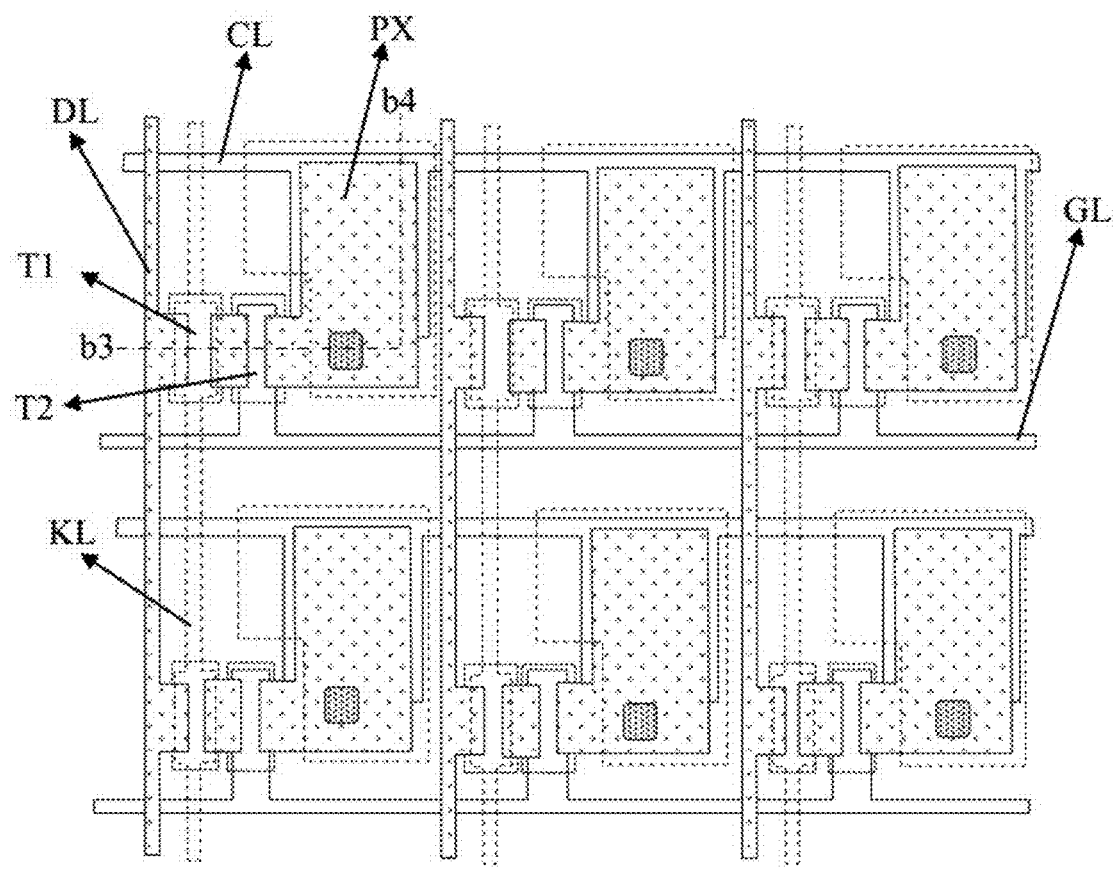
FIG. 12 is a structural diagram of another array substrate according to an embodiment of the present disclosure.
Figure 13:
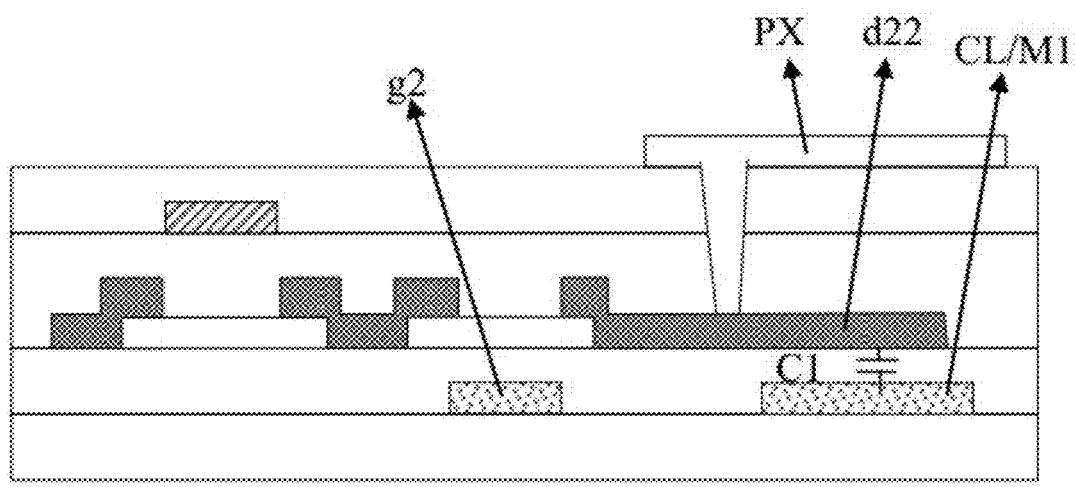
FIG. 13 is a sectional view taken along a line b3-b4 of FIG. 12.

FIG. 12 is a structural diagram of another array substrate according to an embodiment of the present disclosure, and FIG. 13 is a sectional view taken along a line b3-b4 of FIG. 12. The pixel structure of the array substrate provided in this embodiment is similar to the pixel structure of the array substrate illustrated in FIGS. 9, 10 and 11. The difference is that the array substrate in this embodiment further includes a storage voltage signal line CL. The storage voltage signal line CL may be formed in the same layer as scanning lines GL, for example, by patterning the first metal layer, and overlaps a second electrode d22 of a second transistor T2. When the storage voltage signal line CL is provided with one common voltage signal, and the second electrode d22 of the second transistor T2 is provided with one data signal, a storage capacitor C1 is formed between the storage voltage signal line CL and the second electrode d22 of the second transistor T2. The storage capacitor C1 may increase the charge storage capacity of the pixel capacitance of the sub-pixel where the storage capacitor C1 is located and improve the drive capacity of the sub-pixel.

Figure 14:
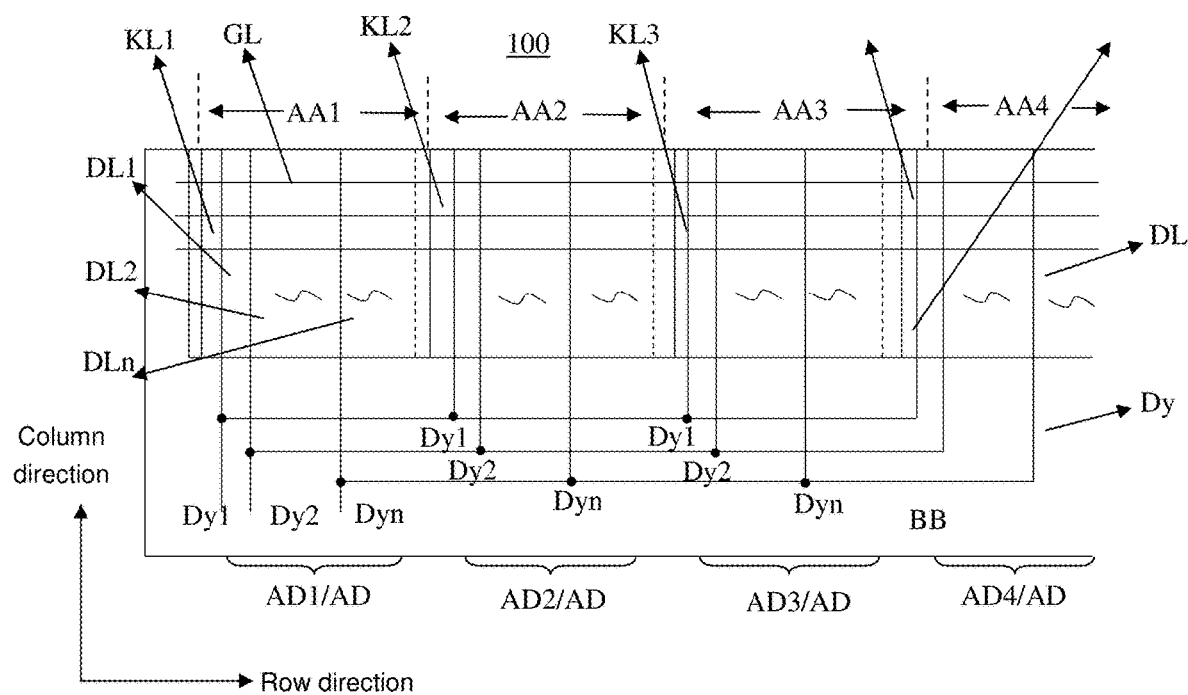
FIG. 14 is a structural diagram of another array substrate according to an embodiment of the present disclosure.

FIG. 14 is a structural diagram of another array substrate according to an embodiment of the present disclosure. The array substrate 100 illustrated in FIG. 14 includes a first sub-display area AA1, a second sub-display area AA2, a third sub-display area AA3 and a fourth sub-display area AA4. The multiple sub-display areas (AA1, AA2, AA3, AA4 and . . . ) are arranged in the row direction and form a strip-shaped array substrate extending along the row direction.

The array substrate 100 further includes a plurality of scanning lines GL. The plurality of scanning lines GL separately pass through the first sub-display area AA1, the second sub-display area AA2, the third sub-display area AA3 and the fourth sub-display area AA4 sequentially. Sub-pixels in the same row in different sub-display areas (AA1, AA2, AA3, AA4 and . . . ) are electrically connected to the same scanning line GL. Each sub-display area (AA1, AA2, AA3, AA4 and . . . ) separately includes a plurality of data lines DL and in each sub-display area, the plurality of data lines DL are extended along the column direction and arranged along the row direction. Sub-pixels in the same column in each sub-display area (AA1, AA2, AA3, AA4 and . . . ) are electrically connected to the same data line DL. At least two control signal lines KL are included. All sub-pixels in each sub-display area (AA1, AA2, AA3, AA4 and . . . ) are electrically connected to a same control signal line KL. Sub-pixels in different sub-display areas (AA1, AA2, AA3 and . . . ) are electrically connected to different control signal lines KL.

In this embodiment, the array substrate 100 further includes multiple groups of data signal lead wires AD which are disposed in one-to-one correspondence to the multiple sub-display areas and in a non-display area BB. Each group of data signal lead wires AD includes multiple data signal lead wires Dy which are electrically connected, in one-to-one correspondence, to the plurality of data lines DL in each sub-display area (AA1, AA2, AA3, AA4 and . . . ). The plurality of data lines DL in each sub-display area are electrically connected to data signal pins DO in the non-display area BB separately through multiple corresponding data signal lead wires Dy.

Specifically, the array substrate 100 includes the first sub-display area AA1, the second sub-display area AA2, the third sub-display area AA3 and the fourth sub-display area AA4 which are sequentially arranged along the row direction. The multiple groups of data signal lead wires AD include a first group of data signal lead wires AD1, a second group of data signal lead wires AD2, a third group of data signal lead wires AD3 and a fourth group of data signal lead wires AD4. The multiple data signal lead wires Dy in the first group of data signal lead wires AD1 are electrically connected, in one-to-one correspondence, to the plurality of data lines DL in the first sub-display area AA1; the multiple data signal lead wires Dy in the second group of data signal lead wires AD2 are electrically connected, in one-to-one correspondence, to the plurality of data lines DL in the second sub-display area AA2; the multiple data signal lead wires Dy in the third group of data signal lead wires AD3 are electrically connected, in one-to-one correspondence, to the plurality of data lines DL in the third sub-display area AA3; the multiple data signal lead wires Dy in the fourth group of data signal lead wires AD4 are electrically connected, in one-to-one correspondence, to the plurality of data lines DL in the fourth sub-display area AA4.

Taking the first sub-display area AA1 and the second sub-display area AA2 as an example, the first sub-display area AA1 and the second sub-display area AA2 are disposed adjacently. The multiple data signal lead wires Dy in the second group of data signal lead wires AD2 are electrically connected, in one-to-one correspondence, to the multiple data signal lead wires Dy in the first group of data signal lead wires AD1. For example, a first data signal lead wire Dy1, a second data signal lead wire Dy2, . . . , and an Nth data signal lead wire Dyn in the second group of data signal lead wires AD2 are separately electrically connected to a first data signal lead Dy1, a second data signal lead wire Dy2, . . . , and an Nth data signal lead wire Dyn in the first group of data signal lead wires AD1, where N is an integer greater than or equal to 3.

Furthermore, the third sub-display area AA3 and the second sub-display area AA2 are disposed adjacently. The multiple data signal lead wires Dy in the third group of data signal lead wires AD3 are electrically connected, in one-to-one correspondence, to the multiple data signal lead wires Dy in the second group of data signal lead wires AD2. For example, a first data signal lead wire Dy1, a second data signal lead wire Dy2, . . . , and an Nth data signal lead wire Dyn in the third group of data signal lead wires AD3 are separately electrically connected to the first data signal lead wire Dy1, the second data signal lead wire Dy2, . . . , and the Nth data signal lead wire Dyn in the second group of data signal lead wires AD2, where N is an integer greater than or equal to 3; and so on.

In this way, the plurality of data lines DL in the second sub-display area AA2, the third sub-display area AA3, the fourth sub-display area AA4 and the like are electrically connected to data signal pins through the multiple data signal lead wires Dy in the first group of data signal lead wires AD1. Therefore, the plurality of data lines DL in the multiple sub-display areas (AA1, AA2, AA3, AA4 and . . . ) shares data signal pins, reducing the number of data signal pins. Meanwhile, control signal lines are used for controlling each sub-display area to be turned on or off, so that even if the corresponding data lines in different sub-display areas share a same data signal pin, the different sub-display areas may be individually controlled. When the control chip and the flexible circuit board are used, only a small number of control chips and flexible circuit boards, even only one control chip and one flexible circuit board, may drive multiple sub-display areas to display pictures. Compared with multiple control chips and multiple flexible circuit boards in the related art, the number of control chips and flexible circuit boards is reduced, thereby saving costs.

Figure 15:
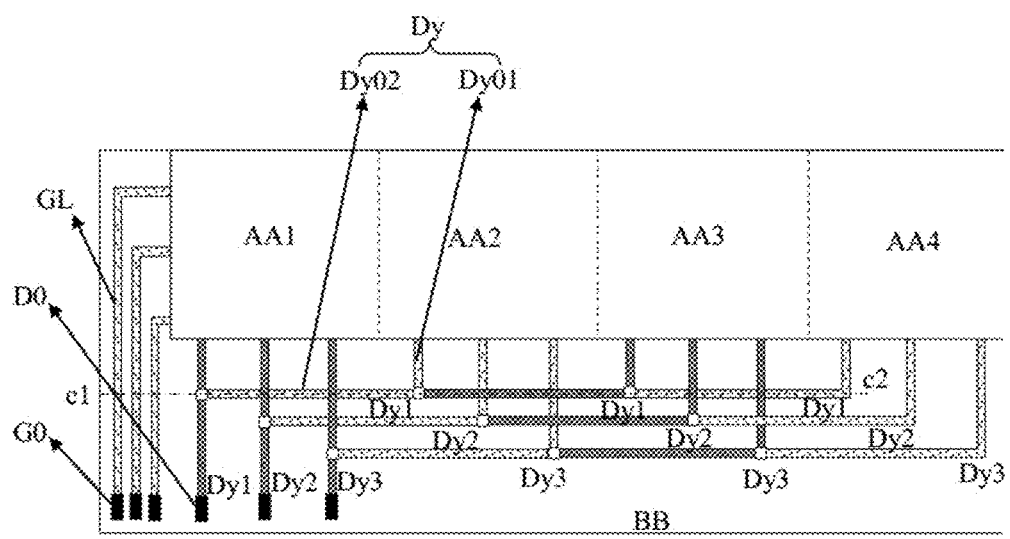
FIG. 15 is a structural diagram of one trace film layer of the array substrate illustrated in FIG. 14.
Figure 16:
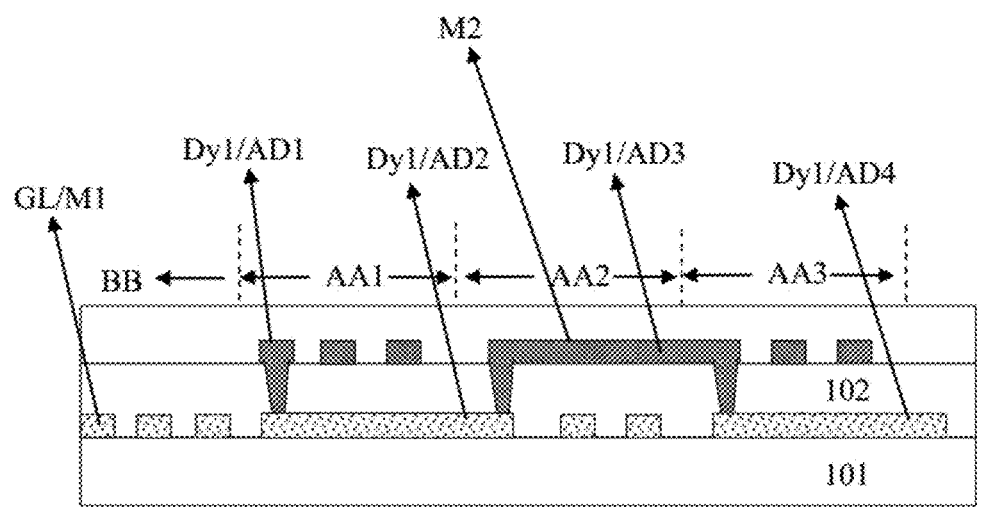
FIG. 16 is a sectional view taken along a line c1-c2 of FIG. 15.

FIG. 15 is a structural diagram of one trace film layer of the array substrate illustrated in FIG. 14, and FIG. 16 is a sectional view taken along a line c1-c2 of FIG. 15. With reference to FIGS. 14, 15 and 16, in this embodiment, the different data signal lead wires Dy electrically connected to adjacent sub-display areas (AA1, AA2, AA3, AA4 and . . . ) are disposed in different film layers. For example, the first group of data signal lead wires AD1 and the second group of data signal lead wires AD2 are separately disposed in different film layers; the second group of data signal lead wires AD2 and the third group of data signal lead wires AD3 are separately disposed in different film layers; and the third group of data signal lead wires AD3 and the fourth group of data signal lead wires AD4 are separately disposed in different film layers.

In this embodiment, the array substrate 100 includes: a substrate 101, a first metal layer M1, a first passivation layer 102, and a second metal layer M2. The first metal layer M1 is disposed on the substrate 101 and includes a plurality of scanning lines GL which are electrically insulated from each other. The first passivation layer 102 is disposed on the substrate 101 and the first metal layer M1 is covered by the first passivation layer 102. The second metal layer M2 is disposed on the first passivation layer 102. The second metal layer M2 and the first metal layer M1 are stacked and insulated from each other through the first passivation layer 102. The second metal layer M2 includes a plurality of data lines DL which are electrically insulated from each other.

In this embodiment, the first group of data signal lead wires AD1 are formed in the second metal layer M2, i.e., the first group of data signal lead wires AD1 and the plurality of data lines DL are formed by patterning the second metal layer M2. The second group of data signal lead wires AD1 are formed in the first metal layer M1, i.e., the second group of data signal lead wires AD2 and the plurality of scanning lines GL are formed by patterning the first metal layer M1. Each data signal lead wire Dy in the second group of data signal lead wires AD2 is electrically connected to a corresponding data line DL through a hole penetrating the first passivation layer 102; the multiple data signal lead wires Dy in the second group of data signal lead wires AD2 are electrically connected, in one-to-one correspondence, to the multiple data signal lead wires Dy in the first group of data signal lead wires AD1 through holes penetrating the first passivation layer 102. Alternatively, the first group of data signal lead wires AD1 may be formed in the first metal layer M1 and the second group of data signal lead wires AD2 may be formed in the second metal layer M2.

In this embodiment, the second group of data signal lead wires AD2 are formed in the first metal layer M1. Each data signal lead wire Dy in the second group of data signal lead wires AD2 is electrically connected to a corresponding data line DL through a hole penetrating the first passivation layer 102. The third group of data signal lead wires AD3 are formed in the second metal layer M2. The multiple data signal lead wires Dy in the third group of data signal lead wires AD3 are electrically connected, in one-to-one correspondence, to the multiple data signal lead Dy in the second group of data signal lead wires AD2 through holes penetrating the first passivation layer 102. Alternatively, the second group of data signal lead wires AD2 may be formed in the second metal layer M2 and the third group of data signal lead wires AD3 may be formed in the first metal layer M1.

In this embodiment, the fourth group of data signal lead wires AD4 are formed in the first metal layer M1. Each data signal lead wire Dy in the fourth group of data signal lead wires AD4 is electrically connected to a corresponding data line DL through a hole penetrating the first passivation layer 102. The third group of data signal lead wires AD3 are formed in the second metal layer M2. The multiple data signal lead wires Dy in the fourth group of data signal lead wires AD4 are electrically connected, in one-to-one correspondence, to the multiple data signal lead wires Dy in the third group of data signal lead wires AD3 through holes penetrating the first passivation layer 102. Alternatively, the fourth group of data signal lead wires AD4 may be formed in the second metal layer M2 and the third group of data signal lead wires AD3 may be formed in the first metal layer M1.

Alternatively, the scanning lines GL may be disposed in the second metal layer M2 and the data lines DL may be disposed in the first metal layer. The embodiments of the present disclosure are not limited in this regard.

In this embodiment, the multiple data signal lead wires Dy in each group of data signal lead wires AD include at least a first data signal lead wire Dy1, a second data signal lead wire Dy2 and a third data signal lead wire Dy3 which are arranged along the row direction. In the first group of data signal lead wires AD1, the second data signal lead wire Dy2 is disposed on one side close to the second sub-display area AA2 of the first data signal lead wire Dy1, and the third data signal lead wire Dy3 is disposed on one side close to the second sub-display area AA2 of the second data signal lead wire Dy1. The first data signal lead wire Dy1 in the second group of data signal lead wires AD2 is electrically connected to first data signal lead wire Dy1 in the first group of data signal lead wires AD1 after sequentially crossing the third data signal lead wire Dy3 and the second data signal lead wire Dy2 in the first group of data signal lead wires AD1; the second data signal lead wire Dy2 in the second group of data signal lead wires AD2 is electrically connected to the second data signal lead wire Dy2 in the first group of data signal lead wires AD1 after crossing the third data signal lead wire Dy3 in the first group of data signal lead wires AD1; and so on.

In this embodiment, each data signal lead wire Dy includes a trace section Dy01 extending along the column direction and an over-line section Dy02 extending along the row direction, where the over-line section Dy02 of each data signal lead Dy is electrically connected to a corresponding data line DL through the trace section Dy01. The over-line section Dy02 of the first data signal lead Dy1 in the second group of data signal lead wires AD2 is electrically connected to first data signal lead Dy1 in the first group of data signal lead wires AD1 after at least crossing the third data signal lead Dy3 and the second data signal lead Dy2 in the first group of data signal lead wires AD1; the over-line section Dy02 of the second data signal lead Dy2 in the second group of data signal lead wires AD2 is electrically connected to the second data signal lead Dy2 in the first group of data signal lead wires AD1 after at least crossing the third data signal lead Dy3 in the first group of data signal lead wires AD1; and so on.

Similarly, the over-line section Dy02 of the first data signal lead wire Dy1 in the third group of data signal lead wires AD3 is electrically connected to first data signal lead wire Dy1 in the second group of data signal lead wires AD2 after at least crossing the third data signal lead wire Dy3 and the second data signal lead wire Dy2 in the second group of data signal lead wires AD2; the over-line section Dy02 of the second data signal lead wire Dy2 in the third group of data signal lead wires AD3 is electrically connected to the second data signal lead wire Dy2 in the second group of data signal lead wires AD2 after at least crossing the third data signal lead wire Dy3 in the second group of data signal lead wires AD2; and so on. The over-line section Dy02 of the first data signal lead wire Dy1 in the fourth group of data signal lead wires AD4 is electrically connected to first data signal lead wire Dy1 in the third group of data signal lead wires AD1 after at least crossing the third data signal lead wire Dy3 and the second data signal lead wire Dy2 in the third group of data signal lead wires AD3; the over-line section Dy02 of the second data signal lead wire Dy2 in the fourth group of data signal lead wires AD4 is electrically connected to the second data signal lead wire Dy2 in the third group of data signal lead wires AD3 after at least crossing the third data signal lead wire Dy3 in the third group of data signal lead wires AD3; and so on.

In the second group of data signal lead wires AD2, the second data signal lead wire Dy2 is disposed on one side away from the first sub-display area AA1 of the first data signal lead wire Dy1, and the third data signal lead wire Dy3 is disposed on one side away from the first sub-display area AA1 of the second data signal lead wire Dy2. The trace section Dy01 of the second data signal lead wire Dy2 is longer than the trace section Dy01 of the first data signal lead wire Dy1 and the trace section Dy01 of the third data signal lead wire Dy3 is longer than the trace section Dy01 of the second data signal lead wire Dy2. In the column direction, the over-line section Dy02 of the second data signal lead wire Dy2 is located below the over-line section Dy02 of the first data signal lead Dy1, the over-line section Dy02 of the third data signal lead wire Dy3 is located below the over-line section Dy02 of the second data signal lead wire Dy2, and so on.

Similarly, in the third group of data signal lead wires AD3, the second data signal lead wire Dy2 is disposed on one side facing away from the second sub-display area AA2 of the first data signal lead wire Dy1, and the third data signal lead wire Dy3 is disposed on one side away from the second sub-display area AA2 of the second data signal lead wire Dy2. The trace section Dy01 of the second data signal lead wire Dy2 is longer than the trace section Dy01 of the first data signal lead wire Dy1 and the trace section Dy01 of the third data signal lead wire Dy3 is longer than the trace section Dy01 of the second data signal lead wire Dy2. In the column direction, the over-line section Dy02 of the second data signal lead wire Dy2 is located below the over-line section Dy02 of the first data signal lead wire Dy1, the over-line section Dy02 of the third data signal lead wire Dy3 is located below the over-line section Dy02 of the second data signal lead wire Dy2, and so on.

In this embodiment, data lines in each sub-display area are electrically connected to each other through data signal lead wires disposed in the non-display area, and different data signal lead wires which are connected to adjacent sub-display areas are disposed in different film layers, so that over-line electrical connection is achieved, the trace setting is optimized, the area of traces in the non-display area is reduced and the frame is narrowed.

Figure 17:
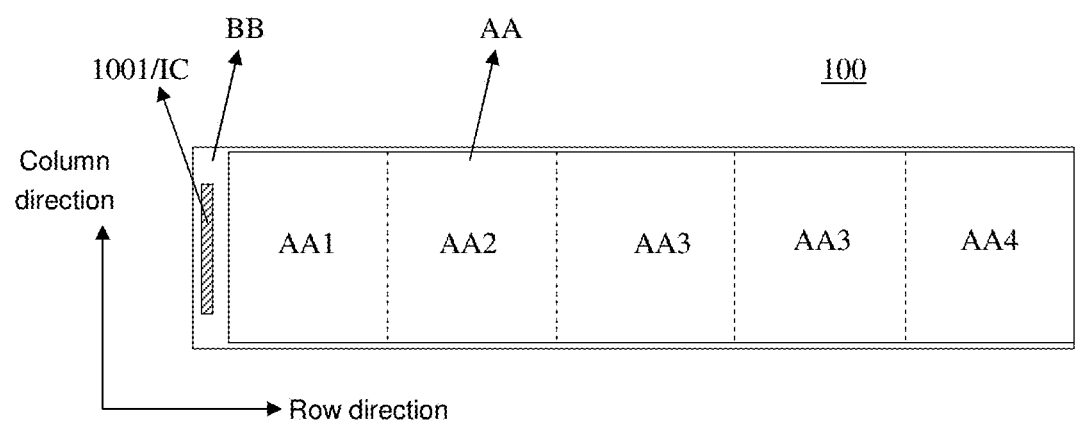
FIG. 17 is a structural diagram of another array substrate according to an embodiment of the present disclosure.

FIG. 17 is a structural diagram of another array substrate according to an embodiment of the present disclosure. In this embodiment, an array substrate 100 includes a display area AA and a non-display area BB disposed on at least one side of the display area AA. The display area AA includes multiple sub-display areas arranged along the row direction (a first sub-display area AA1, a second sub-display area AA2, a third sub-display area AA3 and a fourth sub-display area AA4). Each sub-display area (AA1, AA2, AA3, AA4 and AA5) may be individually controlled.

The array substrate 100 further includes a bonding area 1001. The bonding area 1001 is only disposed in the non-display area, at one end of the array substrate 100 in the row direction. Data signal pins, scanning signal pins and control signal pins are disposed in the bonding area 1001 of the array substrate. Data lines, scanning lines and control signal lines in all sub-display areas are electrically connected to corresponding pins in the bonding area 1001. The array substrate 100 further included one control chip IC which is bound in the bonding area 1001 of the array substrate. Data signal pins, scanning signal pins and control signal pins are electrically connected to corresponding drive pins on the control chip IC. The array substrate, for example, may further include a flexible circuit board, and the drive pins of the control chip (IC) are electrically connected to an external drive circuit through traces on the flexible circuit board.

Figure 18:
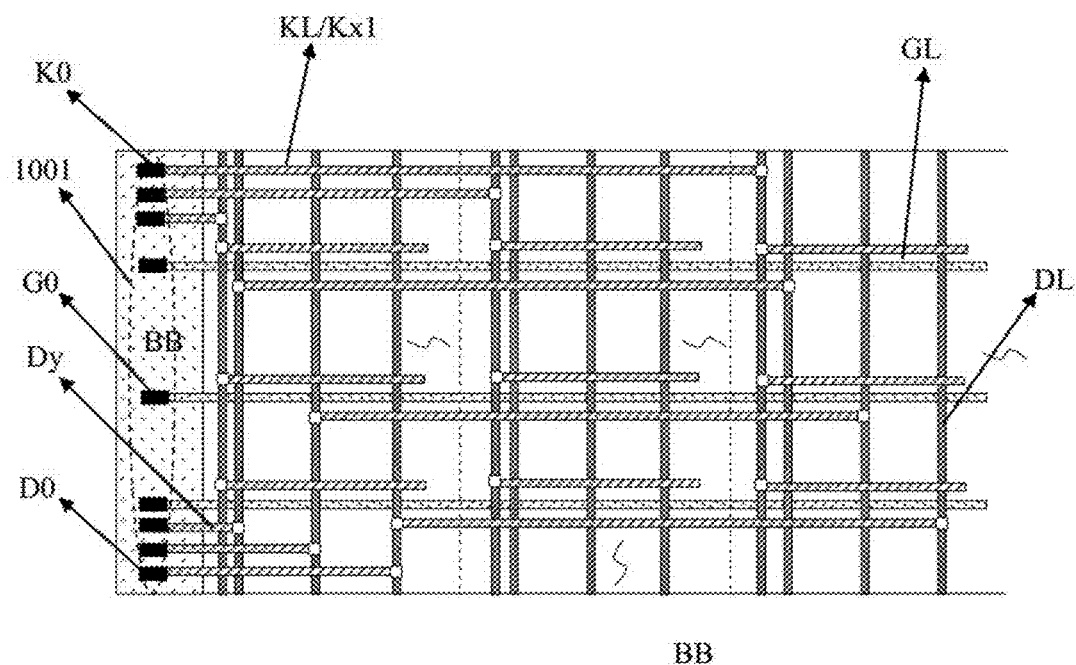
FIG. 18 is a structural diagram of one trace film layer of the array substrate illustrated in FIG. 17.

FIG. 18 is a structural diagram of one trace film layer of the array substrate illustrated in FIG. 17. In this embodiment, a plurality of scanning lines GL are extended along the row direction and arranged along the column direction. The plurality of scanning lines GL penetrate the entire display area and are extended from the display area AA to the bonding 1001, and the plurality of scanning lines GL are electrically connected to scanning signal pins in the bonding area 1001.

In each sub-display area, a plurality of data lines DL are extended along the column direction and are arranged along the row direction. Corresponding data lines DL in different sub-display areas are electrically connected to each other. The array substrate 100 further includes multiple data signal lead wires Dy extending along the row direction and arranged along the column direction. The plurality of data lines DL are electrically connected, in one-to-one correspondence, to the multiple data signal lead wires Dy. The plurality of data lines DL are electrically connected to data signal pins in the bonding area 1002 through corresponding data signal lead wires Dy.

The array substrate 100 further includes a plurality of control signal lines KL extending along the column direction and arranged along the row direction and multiple control signal lead wires Kx1 extending along the row direction and arranged along the column direction. The plurality of control signal lines KL are disposed in one-to-one correspondence to multiple sub-display areas and all sub-pixels in each sub-display area are electrically to a same control signal line KL which controls one sub-display area to be turned on or off. The plurality of control signal lines KL are electrically connected, in one-to-one correspondence, to the multiple control signal lead wires Kx1, and the multiple control signal lines KL are electrically connected to the control signal pins in the bonding area 1001 through corresponding control signal lead wires Kx1.

In one embodiment of the present disclosure, for example, the array substrate may include a first metal layer, a second metal layer and a third metal layer which are sequentially stacked. A plurality of scanning lines GL are formed in the first metal layer, a plurality of data lines DL and a plurality of control signal lines KL are formed in the second metal layer and multiple data signal lead wires Dy and multiple control signal lead wires Kx1 are formed in the third metal layer.

Different sub-display areas may be individually controlled. When the control chip and the flexible circuit board are employed, only a small number of control chips and flexible circuit boards, even only one control chip and one flexible circuit board, may drive multiple sub-display areas to display pictures. Compared with multiple control chips and multiple flexible circuit boards in the related art, the number of control chips and flexible circuit boards is reduced, thereby saving costs.

Figure 19:
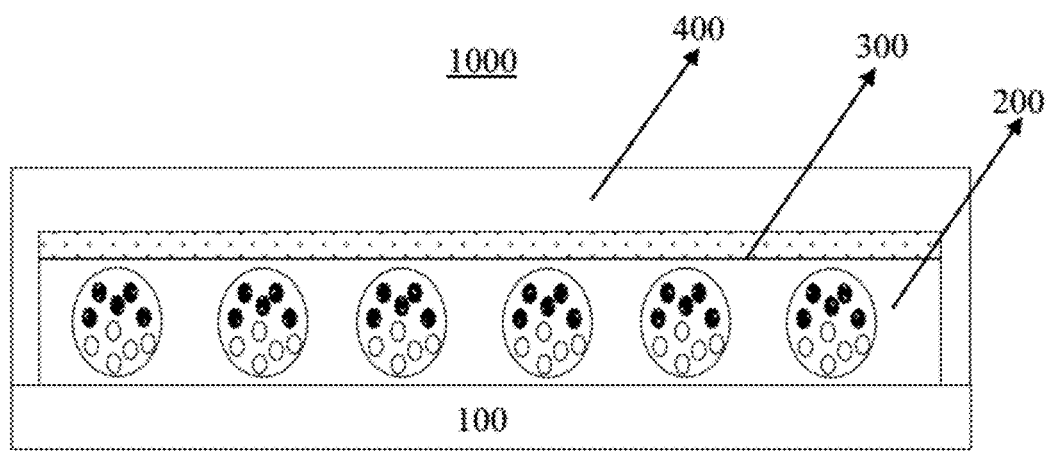
FIG. 19 is a structural diagram of an electronic paper display panel according to an embodiment of the present disclosure.

In addition, an embodiment of the present disclosure provides an electronic paper display panel including the array substrate according to any embodiment of the present disclosure. FIG. 19 is a structural diagram of an electronic paper display panel according to an embodiment of the present disclosure. The electronic paper display panel 1000 further includes an electrophoretic film 200 and a common electrode layer 300. The electrophoretic film 200 is disposed between the common electrode layer 300 and the array substrate 100 and multiple sub-display areas of the array substrate 100 are covered by the electrophoretic film 200. An electrophoretic layer is disposed in the electrophoretic film 200 and includes multiple electrophoretic particles.

Figure 20:
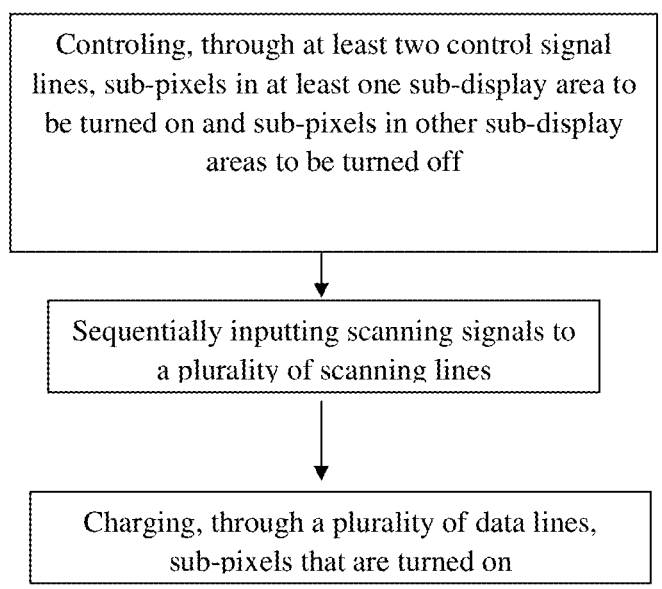
FIG. 20 is a schematic view of a method for driving an electronic paper display panel according to an embodiment of the present disclosure.

An embodiment of the present disclosure further provides a method for driving the electronic paper display panel according to any one of the above-mentioned embodiments. With reference to FIG. 20, the method for driving the electronic paper display panel provided in this embodiment includes: controlling, through at least two control signal lines, sub-pixels in at least one of the sub-display areas to be turned on and sub-pixels in other sub-display areas to be turned off; sequentially inputting scanning signals to multiple scanning lines; and charging, through multiple data lines, all sub-pixels which are turned on. In this way, multiple sub-display areas may display pictures separately.

Figure 21:
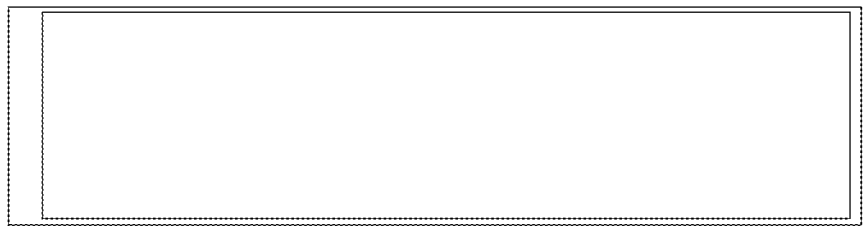
FIG. 21 is a structural diagram of a display device according to an embodiment of the present disclosure.

An embodiment of the present disclosure further provides a display device. FIG. 21 is a structural diagram of a display device according to an embodiment of the present disclosure. The display device 2000 includes the electronic paper display panel according to any embodiment of the present disclosure and multiple display areas which may be individually controlled to display different pictures simultaneously, and requires a smaller number of control chips and/or flexible circuit boards, even one control chip and/or flexible circuit board, thereby saving costs. The display device may be, for example, an electronic reader (electronic book), an electronic price tag, an industrial instrument and meter, a dynamic display billboard, a media product, and the like.

What is claimed is:

1. An array substrate, comprising: a display area and a non-display area, wherein the display area comprises a plurality of sub-display areas, the display area comprises a plurality of scanning lines, each of the plurality of sub-display areas comprises a plurality of data lines, and the plurality of data lines are intersected with the plurality of scanning lines to form a plurality of sub-pixels; wherein
  in the display area, sub-pixels in a same row are electrically connected to a same scanning line; wherein in each of the plurality of sub-display area, sub-pixels in a same column are electrically connected to a same data line; wherein the plurality of data lines in each of the plurality of sub-display area comprise data lines numbered from a first data line to an Nth data line, the plurality of data lines in each of the plurality of sub-display areas are electrically insulated from each other, data lines having a same data line number in different sub-display areas are electrically connected to each other, where N is an integer larger than or equal to 3; wherein the array substrate further comprises at least two control signal lines and a plurality of connection lines, the plurality of sub-pixels in each of the plurality of sub-display areas are electrically connected to a same control signal line, and sub-pixels in different sub-display areas are electrically connected to different control signal lines;

the data lines having a same data line number in the different sub-display areas are electrically connected to each other through one of the plurality of connection lines; and wherein the array substrate further comprises a first metal layer, a second metal layer and a third metal layer which are sequentially stacked, the plurality of scanning lines are formed in the first metal layer, the plurality of data lines in the plurality of sub-display areas are formed in the second metal layer, and the plurality of connection lines are formed in the third metal layer.

2. The array substrate according to claim 1, wherein the plurality of connection lines are disposed in the display area.

3. The array substrate according to claim 1, wherein the plurality of data lines in the plurality of sub-display areas are extended along a column direction and the plurality of scanning lines are extended along a row direction;

wherein the non-display area is located at one end of the array substrate in the column direction, and the non-display area further comprises a control signal pin, and each of the plurality of sub-pixels is electrically connected to the control signal pin through the at least two control signal lines; and wherein each of the at least two control signal lines comprises a main line extending along the column direction and a plurality of sublines extending along the row direction, each of the plurality of sub-pixels is electrically connected to the main line through one of the plurality of subline, and the main line of each of the at least two control signal lines is extended from the display area to the non-display area.

4. The array substrate according to claim 3, wherein main lines of the at least two control signal lines are disposed in the second metal layer and sublines of the at least two control signal lines are disposed in the third metal layer.

5. The array substrate according to claim 1, wherein the plurality of data lines in the plurality of sub-display areas are extended along a column direction and the plurality of scanning lines are extended along a row direction; wherein the non-display area is located at one end of the array substrate in the column direction and the non-display area further comprises a scanning signal pin; and wherein the array substrate further comprises a plurality of scanning signal lead wires extending along the column direction, each of the plurality of scanning lines is electrically connected to the scanning signal pin through a respective one of the plurality of scanning signal lead wires, and the plurality of scanning signal lead wires are extended from the display area to the non-display area.

6. The array substrate according to claim 5, wherein the scanning signal lead wires are disposed in the second metal layer.

7. The array substrate according to claim 1, wherein each of the plurality of sub-pixels further comprises a pixel drive module and a pixel electrode, and in each of the sub-pixels:

a control signal input terminal of the pixel drive module is electrically connected to a respective one of the at least two control signal lines, a scanning signal input terminal of the pixel drive module is electrically connected to a respective one of the plurality of scanning lines, a data signal input terminal of the pixel drive module is electrically connected to a respective one of the plurality of data lines, and a data signal output terminal of the pixel drive module is electrically connected to the pixel electrode.

8. The array substrate according to claim 7, wherein the pixel drive module comprises a first transistor and a second transistor, wherein a first electrode of the first transistor is electrically connected to the respective of the data lines, a second electrode of the first transistor is electrically connected to the first electrode of the second transistor, and a second electrode of the second transistor is electrically connected to the pixel electrode; wherein a control terminal of the first transistor is electrically connected to the respective one of the plurality of scanning lines, and a control terminal of the second transistor is electrically connected to the respective one of the at least two control signal lines; or the control terminal of the first transistor is electrically connected to the respective one of the at least two control signal lines, and the control terminal of the second transistor is electrically connected to the respective one of the plurality of scanning lines.

9. The array substrate according to claim 7, wherein the first transistor and the second transistor are low temperature polysilicon thin film transistors.

10. The array substrate according to claim 1, wherein the plurality of sub-display areas are arranged in the row direction, wherein the array substrate further comprises a control chip disposed in the non-display area and disposed below one of the plurality of sub-display areas.

11. The array substrate according to claim 1, wherein the plurality of sub-display areas are arranged in the row direction, and the array substrate further comprises a control chip disposed in the non-display area and disposed at one end of the array substrate in the row direction.

12. An electronic paper display panel, comprising the array substrate according to claim 1, an electrophoretic film and a common electrode layer;

wherein the electrophoretic film is disposed between the common electrode layer and the array substrate, and the plurality of sub-display areas are covered by the electrophoretic film.

13. A method for driving an electronic paper display panel, wherein the electronic paper display panel comprises an array substrate, wherein the array substrate comprises a display area and a non-display area, the display area comprises a plurality of sub-display areas, the display area comprises a plurality of scanning lines, each of the sub-display areas comprises a plurality of data lines, and the plurality of data lines are intersected with the plurality of scanning lines to form a plurality of sub-pixels; wherein in each of the plurality of sub-display areas, sub-pixels in a same column are electrically connected to a same data line;
in the display area, sub-pixels in a same row are electrically connected to a same scanning line;
the plurality of data lines in the each of the plurality of sub-display areas comprise data lines numbered from a first data line to an Nth data line, the plurality of data lines in the each sub-display area are electrically insulated from each other, data lines having a same data line number in different sub-display areas are electrically connected to each other, where N is an integer larger than or equal to 3;
the array substrate further comprises at least two control signal lines and a plurality of connection lines, the plurality of sub-pixels in the each of the plurality of sub-display areas are electrically connected to a same control signal line, and sub-pixels in different sub-display areas are electrically connected to different control signal lines;
the data lines having a same data line number in the different sub-display areas are electrically connected to each other through one of the plurality of connection lines; and
wherein the array substrate further comprises a first metal layer, a second metal layer and a third metal layer which are sequentially stacked, the plurality of scanning lines are formed in the first metal layer, the plurality of data lines in the plurality of sub-display areas are formed in the second metal layer, and the plurality of connection lines are formed in the third metal layer;
the drive method comprises:
controlling, through the at least two control signal lines, sub-pixels in at least one of the plurality of sub-display areas to be turned on and sub-pixels in other sub-display areas to be turned off;
sequentially inputting scanning signals to the plurality of scanning lines; and
charging, through the plurality of data lines, the sub-pixels that are turned on.

14. An array substrate, comprising: a display area and a non-display area, wherein the display area comprises a plurality of sub-display areas, the display area comprises a plurality of scanning lines, each of the plurality of sub-display areas comprises a plurality of data lines, and the plurality of data lines are intersected with the plurality of scanning lines to form a plurality of sub-pixels; wherein
in the display area, sub-pixels in a same row are electrically connected to a same scanning line; wherein
in each of the plurality of sub-display area, sub-pixels in a same column are electrically connected to a same data line; wherein
the plurality of data lines in each of the plurality of sub-display area comprise data lines numbered from a first data line to an Nth data line, the plurality of data lines in each of the plurality of sub-display areas are electrically insulated from each other, data lines having a same data line number in different sub-display areas are electrically connected to each other, where N is an integer larger than or equal to 3; wherein
the array substrate further comprises at least two control signal lines, the plurality of sub-pixels in each of the plurality of sub-display areas are electrically connected to a same control signal line, and sub-pixels in different sub-display areas are electrically connected to different control signal lines;

the non-display area further comprises a plurality of groups of data signal lead wires, respectively disposed in one-to-one relationship with the plurality of sub-display areas; wherein the plurality of sub-display areas comprise a first sub-display area and a second sub-display area disposed adjacently, and the plurality of groups of data signal lead wires comprise a first group of data signal lead wires and a second group of data signal lead wires, a plurality of data signal lead wires in the first group of data signal lead wires are respectively electrically connected, in one-to-one correspondence, to a plurality of data lines in the first sub-display area, and a plurality of data signal lead wires in the second group of data signal lead wires are respectively electrically connected, in one-to-one correspondence, to a plurality of data lines in the second sub-display area; wherein
the plurality of data lines in the first sub-display area are electrically connected, in one-to-one correspondence, to the plurality of data lines in the second sub-display area respectively through the plurality of data signal lead wires;
wherein the first group of data signal lead wires and the second group of data signal lead wires are disposed in different metal layers; wherein
each group of data signal lead wires comprises a first data signal lead wire and a second data signal lead wire arranged along the row direction, and in the first group of data signal lead wires, the second data signal lead wire is disposed on one side of the first data signal lead wire close to the second sub-display area; and wherein
the first data signal lead wire of the second group of data signal lead wires, across the second data signal lead wire in the first group of data signal lead wires, is electrically connected to the first data signal lead wire in the first group of data signal lead wires.

15. The array substrate according to claim 14, wherein each data signal lead wire in the second group of data signal lead wires comprises a trace section extending along the column direction and an over-line section extending along the row direction, and the over-line section is electrically connected to a respective data line through the trace section; and wherein
the over-line section of the first data signal lead wire in the second group of data signal lead wires, across the second data signal lead wire in the first group of data signal lead wires, is electrically connected to the first data signal lead wire in the first group of data signal lead wires.

16. The array substrate according to claim 15, wherein in the second group of data signal lead wires, the second data signal lead wire is disposed on one side of the first data signal lead wire facing away from the first sub-display area;
the second data signal lead wire in the second group of data signal lead wires is electrically connected to the second data signal lead wire in the first group of data signal lead wires; and wherein
in the second group of data signal lead wires, the trace section of the second data signal lead wire is longer than the trace section of the first data signal lead wire, and in the column direction, the over-line section of the second data signal lead wire is disposed below the over-line section of the first data signal lead wire.

17. The array substrate according to claim 14, wherein the array substrate further comprises a first metal layer and a second metal layer which are sequentially stacked, wherein the plurality of scanning lines are disposed in the first metal layer and the plurality of data lines in the plurality of sub-display areas are disposed in the second metal layer; and wherein
   the first group of data signal lead wires are disposed in the first metal layer and the second group of data signal lead wires are disposed in the second metal layer.

* * * * *